(12) United States Patent
Matsumoto et al.

(10) Patent No.: US 7,703,062 B2
(45) Date of Patent: Apr. 20, 2010

(54) SEMICONDUCTOR INTEGRATED CIRCUIT AND METHOD OF DESIGNING LAYOUT OF THE SAME

(75) Inventors: Shuuji Matsumoto, Kanagawa-ken (JP); Keiko Fukuda, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 515 days.

(21) Appl. No.: 11/677,913

(22) Filed: Feb. 22, 2007

(65) Prior Publication Data

US 2007/0198962 A1 Aug. 23, 2007

(30) Foreign Application Priority Data

Feb. 23, 2006 (JP) ............................. 2006-046676

(51) Int. Cl.
G06F 17/50 (2006.01)
H01L 25/00 (2006.01)
H03K 17/16 (2006.01)
H03K 19/003 (2006.01)
H03K 19/0175 (2006.01)

(52) U.S. Cl. ............................... 716/9; 716/10; 716/13; 716/14; 326/33; 326/41; 326/47; 326/63; 326/101

(58) Field of Classification Search .................. 326/33, 326/41, 47, 63, 101; 716/9, 10, 13, 14
See application file for complete search history.

(56) References Cited

U.S. PATENT DOCUMENTS

| 4,755,695 | A | * | 7/1988 | Suzuki | ........................ 326/17 |
|---|---|---|---|---|---|
| 4,849,660 | A | * | 7/1989 | Hayashi et al. | ............... 326/66 |
| 4,999,519 | A | * | 3/1991 | Kitsukawa et al. | .......... 326/110 |
| 5,151,616 | A | * | 9/1992 | Komuro | ..................... 326/121 |
| 5,151,619 | A | * | 9/1992 | Austin et al. | .................. 326/86 |
| 5,729,154 | A | * | 3/1998 | Taguchi et al. | ................. 326/30 |
| 6,373,283 | B2 | * | 4/2002 | Matsumoto | ................... 326/68 |
| 6,531,893 | B2 | * | 3/2003 | Matsumoto | ................... 326/68 |
| 6,556,071 | B2 | * | 4/2003 | Notani et al. | ............... 327/544 |
| 6,635,934 | B2 | * | 10/2003 | Hidaka | ........................ 257/369 |
| 6,784,718 | B2 | * | 8/2004 | Okamoto et al. | ............ 327/333 |
| 6,834,004 | B2 | * | 12/2004 | Takano et al. | ................. 365/51 |
| 7,095,249 | B2 | * | 8/2006 | Mitarashi | ..................... 326/81 |
| 7,193,441 | B2 | * | 3/2007 | Chen et al. | .................... 326/81 |

(Continued)

FOREIGN PATENT DOCUMENTS

JP 2004-186666 7/2004

*Primary Examiner*—Phallaka Kik
(74) *Attorney, Agent, or Firm*—Oblon, Spivak, McClelland, Maier & Neustadt, L.L.P.

(57) ABSTRACT

A semiconductor integrated circuit includes: a first boundary cell having a first power source wiring, a second power source wiring and a first pseudo power source wiring; a first circuit cell having a third power source wiring connected with the first power source wiring, a second pseudo power source wiring connected with the first pseudo power source wiring, and a first circuit formed of a first circuit transistor; and a first switching transistor having a first electrode connected with the second power source wiring, a second electrode connected with the first pseudo power source wiring, and a gate electrode, wherein the first switching transistor is operated to be turned "ON" and "OFF" according to a control signal inputted to the gate electrode of the first switching transistor and an absolute value of a threshold voltage of the first switching transistor is larger than an absolute value of a threshold voltage of the first circuit transistor.

16 Claims, 15 Drawing Sheets

U.S. PATENT DOCUMENTS

| | | | |
|---|---|---|---|
| 7,469,389 B2* | 12/2008 | Namba et al. | 716/1 |
| 7,521,762 B2* | 4/2009 | Hidaka | 257/369 |
| 7,589,566 B2* | 9/2009 | Ohbayashi et al. | 326/101 |
| 2001/0022520 A1* | 9/2001 | Matsumoto | 326/81 |
| 2002/0093362 A1* | 7/2002 | Matsumoto | 326/80 |
| 2004/0217776 A1* | 11/2004 | Horiguchi et al. | 326/80 |
| 2005/0212560 A1* | 9/2005 | Hidaka | 326/83 |
| 2007/0083842 A1* | 4/2007 | Namba et al. | 716/17 |

* cited by examiner

SEMICONDUCTOR INTEGRATED CIRCUIT AND METHOD OF DESIGNING LAYOUT OF THE SAME

CROSS-REFERENCE TO RELATED APPLICATIONS

This application is based upon and claims the benefit of priority from the prior Japanese Patent Application No. 2006-046676, filed Feb. 23, 2006, the entire contents of which are incorporated herein by reference.

BACKGROUND OF THE INVENTION

1. Field of the Invention

The present invention relates to a logic circuit, an amplifier circuit or the like that is provided with a switching transistor isolating a power source.

2. Description of the Related Art

In recent years, there has been a request for a portable electronic device, which operates at higher speed, and also which is driven for a longer time by a battery. For the purpose of responding to the request, there is a demand for a semiconductor integrated circuit to be mounted on such portable electronic devices, which achieves low power consumption while capable of operating at a high speed. When a power source voltage of a semiconductor integrated circuit is reduced for the purpose of reducing power consumption, an operating speed of the semiconductor integrated circuit is also reduced. Accordingly, it is necessary to reduce a threshold voltage (Vth) of a MOS transistor (also termed as a Metal Oxide Semiconductor Field Effect Transistor (MOSFET)). When the threshold voltage of the MOS transistor is reduced, a leakage current is increased. For this reason, in the case of a MT-CMOS (Multi Threshold-Complementary Metal Oxide Semiconductor) technique that uses a several kinds of threshold voltages, a transistor having a high threshold voltage (High Vth) serving as a switching transistor is disposed between an actual power source line and a power source line of a circuit formed of a transistor having a low threshold voltage (Low Vth). Thereby, electric power can be controlled (see, for example, Japanese Patent Application Laid-open No. 2004-186666, pp. 19, FIGS. 1, 2).

However, in a semiconductor integrated circuit, which has a leakage current cut-off circuit, and which is formed by the MT-CMOS technique, there is a problem as follows. Specifically, it is necessary to form a cell having a leakage current cut-off circuit inserted thereinto in a circuit formed of a low threshold voltage transistor each time. As a result, a time required for designing a layout of the semiconductor integrated circuit is increased. In addition, the size of a cell having a leakage current cut-off circuit inserted thereinto becomes larger than that of an existing basic cell. This causes a problem where the number of cell libraries is increased because it is necessary to create a new cell library as a MT-CMOS cell having a leakage current cut-off circuit inserted thereinto.

BRIEF SUMMARY OF THE INVENTION

According to an aspect of the present invention, there is provided a semiconductor integrated circuit comprising a first boundary cell having a first power source wiring, a second power source wiring and a first pseudo power source wiring; a first circuit cell having a third power source wiring connected with the first power source wiring, a second pseudo power source wiring connected with the first pseudo power source wiring, and a first circuit formed of a first circuit transistor; and a first switching transistor having a first electrode connected with the second power source wiring, a second electrode connected with the first pseudo power source wiring, and a gate electrode, wherein the first switching transistor is operated to be turned "ON" and "OFF" according to a control signal inputted to the gate electrode of the first switching transistor and an absolute value of a threshold voltage of the first switching transistor is larger than an absolute value of a threshold voltage of the first circuit transistor.

According to another aspect of the present invention, there is provided a semiconductor integrated circuit comprising a switching transistor cell having a first power source wiring, a second power source wiring, a first pseudo power source wiring, and switching transistor; and a circuit cell having a third power source wiring connected with the first power source wiring, a second pseudo power source wiring connected with the first pseudo power source wiring, and a circuit formed of a circuit transistor, wherein the switching transistor having a first electrode connected with the second power source wiring, a second electrode connected with the first pseudo power source wiring, and a gate electrode, the switching transistor is operated to be turned "ON" and "OFF" according to a control signal inputted to the gate electrode of the switching transistor and an absolute value of a threshold voltage of the switching transistor is larger than an absolute value of a threshold voltage of the circuit transistor.

According to another aspect of the present invention, there is provided a method of designing a semiconductor integrated circuit comprising disposing a boundary cell having a first power source wiring, a second power source wiring and a first pseudo power source wiring; disposing, a circuit cell which includes a third power source wiring connected with the first power source wiring, a second pseudo power source wiring connected with the first pseudo power source wiring, and a circuit formed of a circuit transistor; and providing a switching transistor, which has an absolute value of a threshold voltage larger than an absolute value of a threshold voltage of the circuit transistor, which is operated to be turned "ON" and "OFF" according to a control signal inputted to a gate of the switching transistor, which electrically connects the first pseudo power source wiring to the second power source wiring when the switching transistor is turned "ON," and which electrically disconnects the first pseudo power source wirings from the second power source wiring when the switching transistor is turned "OFF."

According to another aspect of the present invention, there is provided a method of designing a semiconductor integrated circuit comprising disposing a switching transistor cell having a first power source wiring, a second power source wiring, a first pseudo power source wiring, and switching transistor; and disposing a circuit cell having a third power source wiring connected with the first power source wiring, a second pseudo power source wiring connected with the first pseudo power source wiring, and a circuit formed of a circuit transistor, wherein the switching transistor having a first electrode connected with the second power source wiring, a second electrode connected with the first pseudo power source wiring, and a gate electrode, the switching transistor is operated to be turned "ON" and "OFF" according to a control signal inputted to the gate electrode of the switching transistor and an absolute value of a threshold voltage of the switching transistor is larger than an absolute value of a threshold voltage of the circuit transistor.

DETAILED DESCRIPTION OF THE INVENTION

Figure 1:
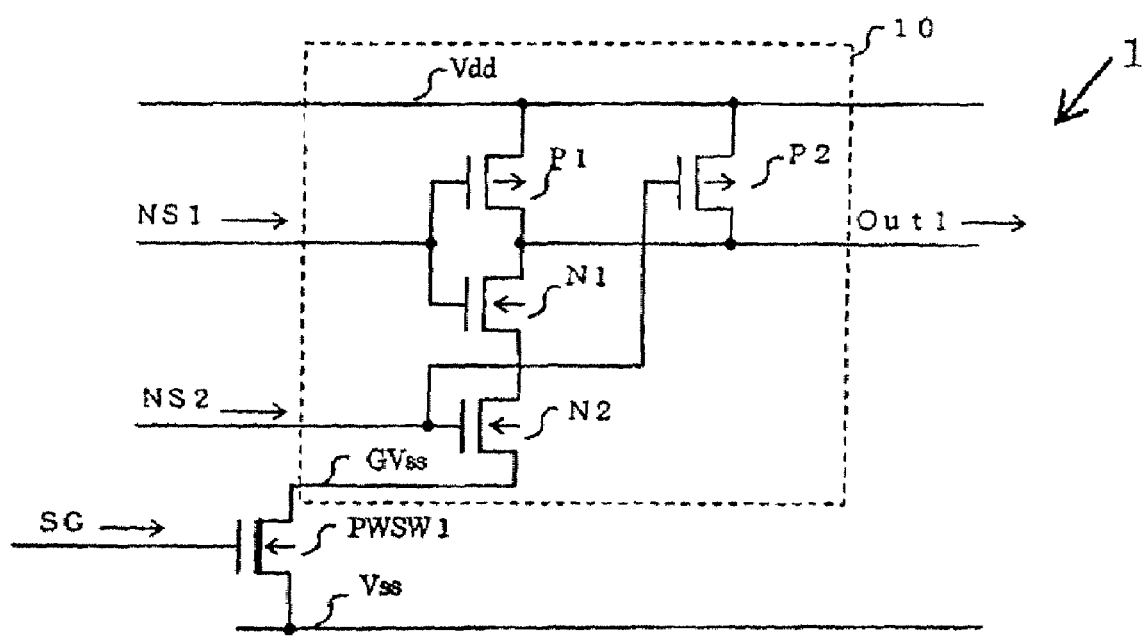
FIG. 1 is a circuit diagram showing a semiconductor integrated circuit according to a first embodiment of the present invention.

Embodiments of the present invention will be described below by referring to the drawings.

First Embodiment

First, a semiconductor integrated circuit according to a first embodiment of the present invention will be described by referring to the drawings. FIG. 1 is a circuit diagram showing a semiconductor integrated circuit. In the present embodiment, a two-input NAND circuit is used as a basic cell.

As shown in FIG. 1, a high-speed NAND gate (a two-input NAND circuit) 10 and a switching transistor PWSW1 are provided in a semiconductor integrated circuit 1. It should be noted that a logic circuit for low power consumption, which is formed of a high threshold voltage transistor using the MT-CMOS technique, an input/output circuit formed of an intermediate threshold voltage transistor, and the like are formed on the semiconductor integrated circuit 1, though not shown in FIG. 1. Here, the logic circuit means a gate such as a NAND gate or a sequential circuit such as a flip flop. The intermediate threshold voltage transistor means a transistor that has an absolute value of a threshold voltage, larger than that of a low threshold voltage transistor, and smaller than that of a high threshold voltage transistor, for example, a transistor that has an absolute value of a threshold voltage $|Vth|=0.35$ V.

The NAND gate 10 is formed of Pch MOS transistors P1 and P2 and Nch MOS transistors N1 and N2, each of which is a low threshold transistor with an absolute value of a threshold voltage of $|Vth|=0.15$ V. The NAND gate 10 receives input signals NS1 and NS2, and outputs an output signal Out1 generated by performing a high speed logic operation.

A source of the Pch MOS transistor P1 is connected to a high potential power source Vdd, and the input signal NS1 is inputted to a gate of the Pch MOS transistor P1. A drain of the Nch MOS transistor N1 is connected to a drain of the Pch MOS transistor P1, and the input signal NS1 is inputted to a gate of the Nch MOS transistor N1. A source of the Pch MOS transistor P2 is connected to the high potential power source Vdd, and the input signal NS2 is inputted to a gate of the Pch MOS transistor P2. A drain of the Nch MOS transistor N2 is connected to a source of the Nch MOS transistor N1 and a source of the Nch MOS transistor N2 is connected to a pseudo low potential power source GVss. Moreover, the input signal NS2 is inputted to the gate of the Nch MOS transistor N1.

A connection node between the drain of the Pch MOS transistor P1 and the drain of the Nch MOS transistor N1 is connected to a drain of the Pch MOS transistor P2, and the output signal Out1 is outputted from the drain of the Pch MOS transistor P2.

The switching transistor PWSW1 is formed of an Nch MOS transistor that is a high threshold voltage transistor having a threshold voltage of, for example, Vth=0.5 V which is larger than the absolute value of threshold voltage of the transistor of the NAND gate 10. A drain of the switching transistor PWSW1 is connected to the pseudo low potential power source GVss, and a source of the switching transistor PWSW1 is connected to a low potential power source Vss. In addition, a control signal SG is inputted to a gate of the switching transistor PWSW1.

In a case where the control signal SG is at a "high" level, the switching transistor PWSW1 is turned "ON." Accordingly, the pseudo low potential power source GVss is connected to the low potential power source Vss, so that the NAND gate 10 is operated at high speed.

On the other hand, in a case where the control signal SG is at a "low" level, the switching transistor PWSW1 is turned "OFF." Accordingly, the pseudo low potential power source GVss is disconnected from the low potential power source Vss. Moreover, since the threshold voltage of the switching transistor PWSW1 is high, a leakage current is extremely small when the switching transistor PWSW1 is OFF. For this reason, the NAND gate 10 is not operated. Furthermore, it is possible to cut off the leakage current of the NAND gate 10 formed of a MOS transistor having a leakage current (also referred to as Idoff that is a current at the time of "OFF") hundred times, or more, larger than that of a MOS transistor such as the switching transistor PWSW1 having a high threshold voltage (the leakage current does not flow to the side of the low potential power source Vss).

It should be noted that the MOS transistor is also referred to as a MOSFET (Metal Oxide Semiconductor Field Effect Transistor). Here, the MOS transistor using a silicon oxide film as a gate insulating film is used. However, it is also possible to use a MIS transistor (also referred to as a MIS-FET) using: a SiNxOy film which is a nitride of a silicon oxide film; a layered film of a silicon nitride film ($Si_3N_4$) and a silicon oxide film; or a high dielectric film (High-K gate insulating film).

Figure 2:
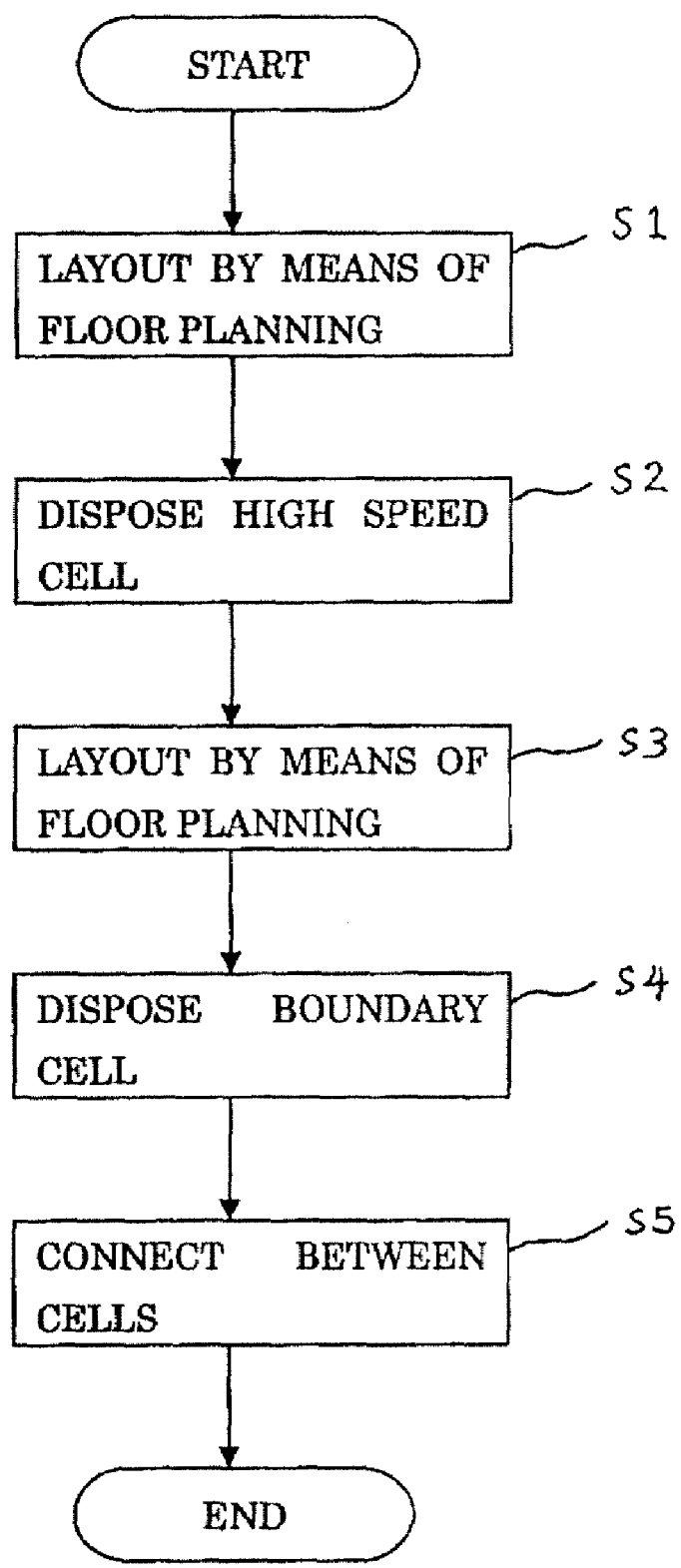
FIG. 2 is an operational flowchart showing a method of designing a layout of the semiconductor integrated circuit according to the first embodiment of the present invention.
Figure 3:
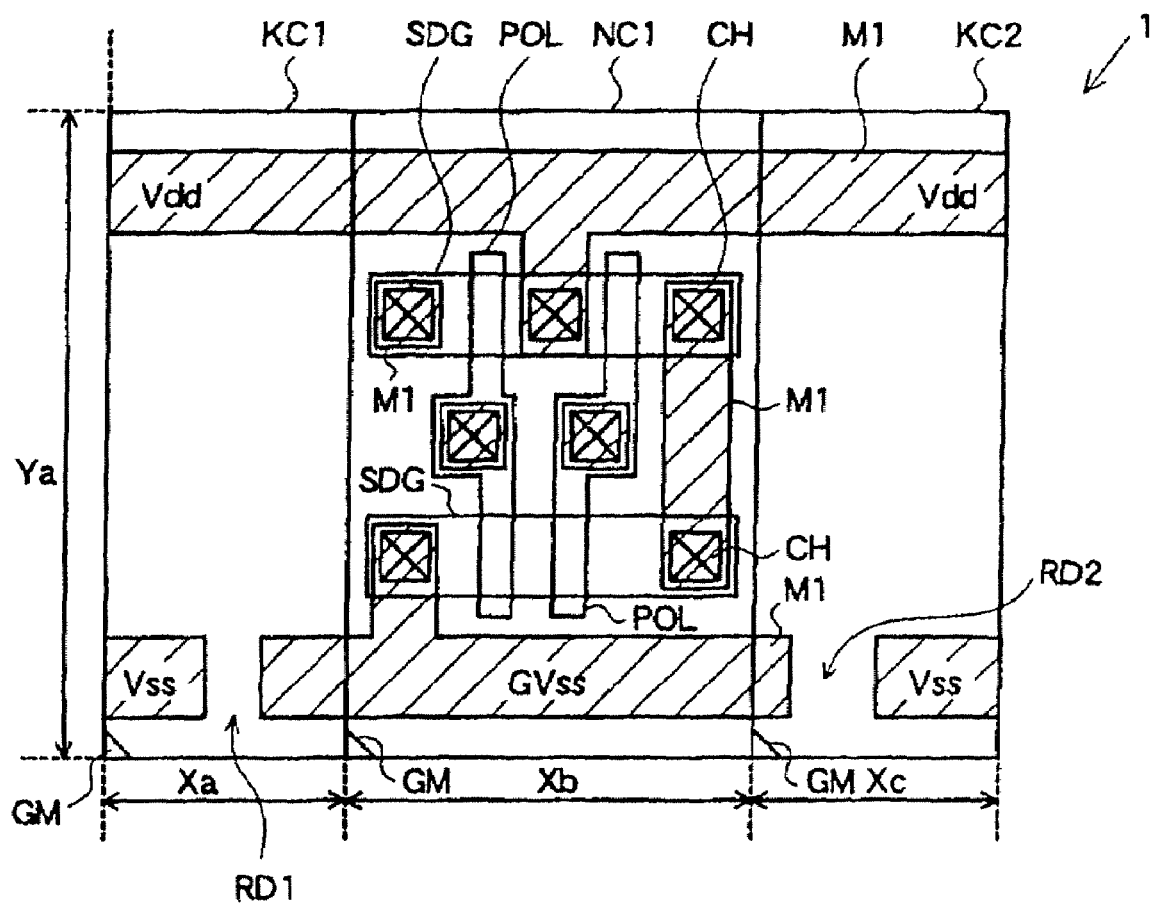
FIG. 3 is a plan view showing a configuration of the semiconductor integrated circuit according to the first embodiment of the present invention, after boundary cells are inserted thereinto.
Figure 4:
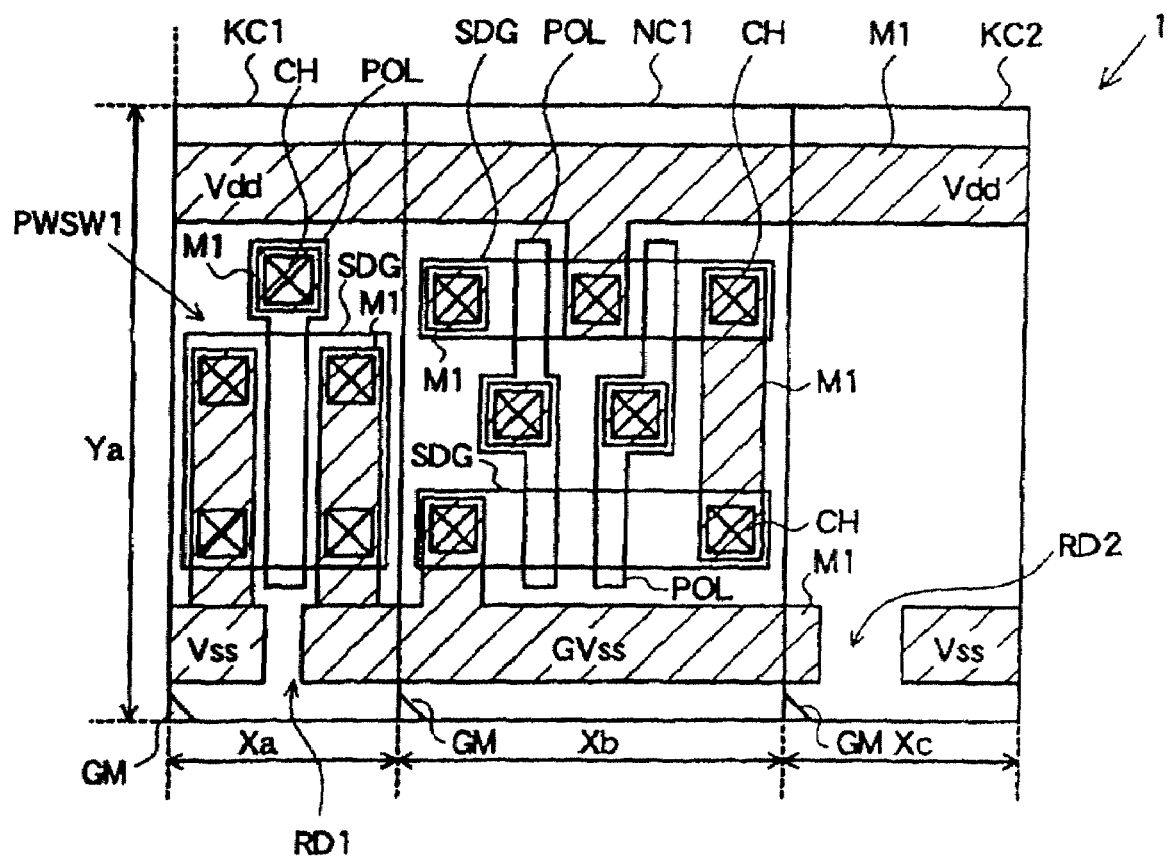
FIG. 4 is a plan view showing a configuration of the semiconductor integrated circuit according to the first embodiment of the present invention, after a switching transistor is inserted thereinto.
Figure 5:
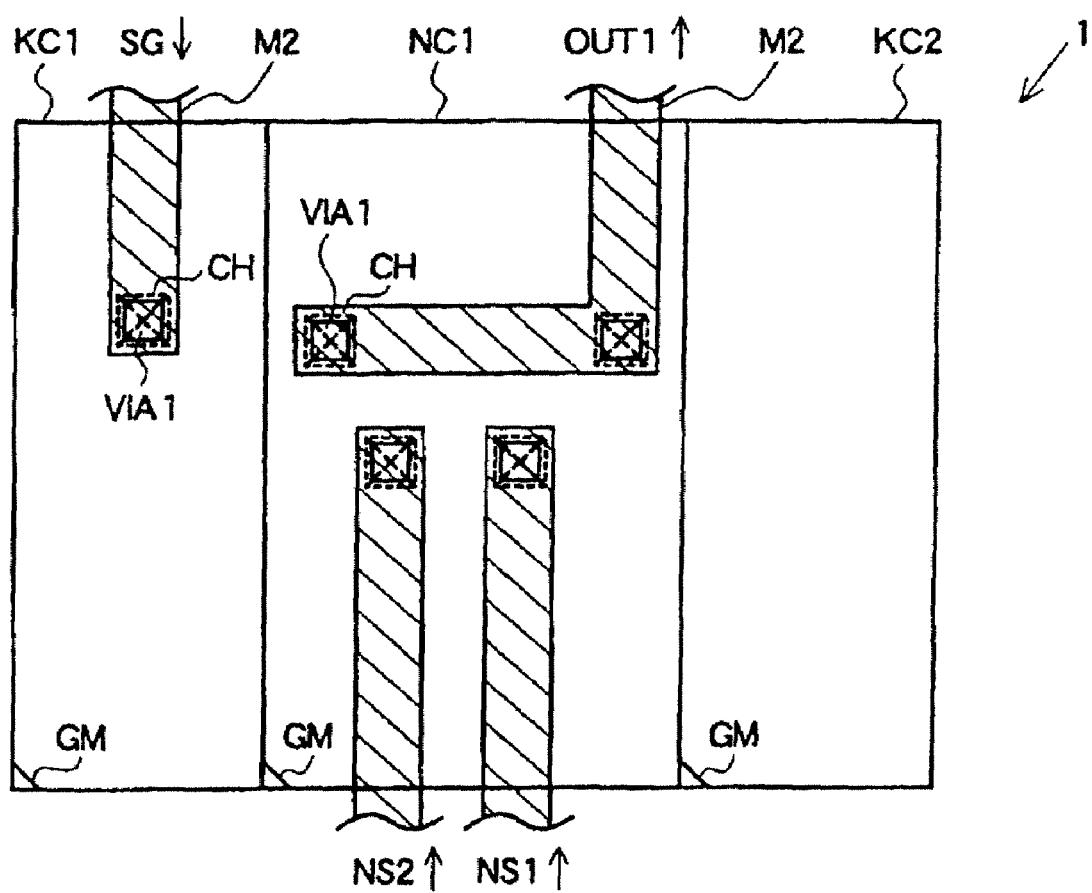
FIG. 5 is a plan view showing a configuration of the semiconductor integrated circuit according to the first embodiment of the present invention, after wirings between cells are connected.

Next, a method of designing a layout of a semiconductor integrated circuit will be described by referring to FIGS. 2 to 6. FIG. 2 is an operational flowchart showing a method of designing a layout of a semiconductor integrated circuit. FIG. 3 is a plan view showing a configuration of the semiconductor integrated circuit after a boundary cell is inserted thereinto. FIG. 4 is a plan view showing a configuration of the semiconductor integrated circuit after a switching transistor is inserted thereinto. FIG. 5 is a plan view showing a configuration of the semiconductor integrated circuit after a wiring is connected between cells. Here, the basic cell and the boundary cell have a layer up to a first layer wiring and the cells are connected using a first via and second or upper layer wirings. In addition, a contact of the cell is provided with the first layer wiring.

As shown in FIG. 2, in the operational flowchart of the method of designing a layout, a layout by means of floor planning is firstly performed by referring to element characteristic information, circuit connection information, process information, layout information, or the like (step S1).

After that, a basic cell is disposed according to the layout. It should be noted that the basic cell is also referred to as a standard cell. As shown in FIG. 3, as the rectangular-shaped basic cell to be disposed, a high speed two-input NAND cell NC1 (corresponding to the NAND gate 10 of FIG. 1), in which an absolute value of a threshold voltage (Vth) of a MOS transistor is 0.15 V, is used.

The two-input NAND cell NC1 has a cell origin GM disposed in the lower left thereof, and has a lateral dimension of Xb and a vertical dimension of Ya. As a layer, the two-input NAND cell NC1 includes diffusion regions SDG for forming transistor regions, polysilicon POL for forming gate electrodes and poly-wirings, contact holes CH for contact openings, and first layer wirings M1. Here, the illustrations of wells provided in the cell and of lower layers formed by ion-implantation and the like are omitted. A high potential power source Vdd wiring formed of the first layer wiring M1 is disposed in the upper portion of the cells, and extends to the boundaries to the adjacent cells. On the other hand, a pseudo low potential power source GVss wiring formed of the first layer wiring M1 is disposed in the lower portion of the cell, and extends to the boundaries of the adjacent cells (step S2).

Next, as shown in FIG. 3, boundary cells KC1 and KC2 are disposed respectively on the left and right sides of the two-input NAND cell NC1. The boundary cell KC1 has a cell origin GM disposed in the lower left thereof, and has a lateral dimension of Xa and a vertical dimension of Ya. As a layer, the boundary cell KC1 includes the first layer wiring M1. The high potential power source Vdd wiring formed of the first layer wiring M1 is disposed in the upper portion of the cell. In addition, the high potential power source Vdd wiring extends to the boundaries of the adjacent cells, and is connected to the high potential power source Vdd wiring of the two-input NAND cell NC1.

On the other hand, the low potential power source Vss wiring formed of the first layer wiring M1 is disposed in the lower left portion of the cell. The low potential power source Vss wiring is isolated from a pseudo low potential power source GVss wiring disposed in the lower right portion of the cell by a power source isolating region RD1. The pseudo low potential power source GVss wiring is connected to the pseudo low potential power source GVss wiring of the two-input NAND cell NC1.

The boundary cell KC2 has a cell origin GM disposed in the lower left thereof, and has a lateral dimension of Xc and a vertical dimension of Ya. As a layer, the boundary cell KC2 includes the first layer wiring M1. The high potential power source Vdd wiring formed of the first layer wiring M1 is disposed in the upper portion of the cell. In addition, the high potential power source Vdd wiring extends to the boundaries of the adjacent cells, and is connected to the high potential power source Vdd wiring of the two-input NAND cell NC1.

On the other hand, the low potential power source Vss wiring formed of the first layer wiring M1 is disposed in the lower right portion of the cell. The low potential power source Vss is isolated from a pseudo low potential power source GVss disposed in the lower left portion of the cell by the power source isolating region RD2. The pseudo low potential power source GVss on the left side is connected to the pseudo low potential power source GVss wiring of the two-input NAND cell NC1 (step S3).

Then, the switching transistor PWSW1 is disposed in the boundary cell KC1. Specifically, as shown in FIG. 4, as a layer, for forming a transistor, in the switching transistor PWSW1, a diffusion region SDG for forming a transistor region, polysilicon POL for forming a gate electrode and a poly wiring, contact holes CH for contact openings, a first layer wiring M1, and the like are disposed. In FIG. 4, the illustrations of wells provided in the cell and of lower layers formed by ion-implantation and the like are omitted. A switching transistor is not provided in the boundary cell KC2. For this reason, the cell adjacent to the right side of the boundary cell KC2 is not electrically connected to the low potential power source Vss of the boundary cell KC1.

Here, the cell size in the vertical direction of the boundary cell KC1 having the switching transistor PWSW1 is set equal to that of the two-input NAND cell NC1 as the basic cell. Accordingly, when compared with the conventional layout method that fifty to sixty kinds of MT-CMOS cells in which a switching transistor and a logic circuit are made in the same cell are properly disposed each time, the flexibility of designing a layout is higher and a time required for designing the layout can be reduced to one twentieth to one thirtieth, or less, of that required in the case of the conventional layout method (step S4).

Next, connection between cells is performed. Specifically, as shown in FIG. 5, a first via VIA1 is provided in a lead-out wiring portion of the gate of the switching transistor provided in the boundary cell KC1, and a second layer wiring M2 is disposed on the first via VIA1. This second layer wiring M2 serves as a wiring used for receiving the control signal SG.

The first via VIA1 is provided in each of two portions in the upper portion of the two-input NAND cell NC1, and the second layer wiring M2 is disposed on the first vias VIA1. This second layer wiring M2 serves as a wiring used for outputting the output signal Out1.

The first via VIA1 is provided in each of two portions in the center portion of the two-input NAND cell NC1, and a second layer wiring M2 is disposed on the first vias VIA1. This second layer wiring M2 serves as a wiring used for receiving the input signals NS1 and NS2 (step S5).

Here, the cells are connected to one another by using the first vias VIA1 and the second layer wiring M2. However, the cells may be connected to one another by using a higher layer such as second vias and a third layer wiring. In addition, directions of extracting the signal lines are not limited to the layout shown in FIG. 5.

As described above, in the semiconductor integrated circuit of the present embodiment, the two-input NAND cell NC1 and the boundary cell KC1 are provided. The two-input NAND cell NC1 has the small absolute value of the threshold voltage of the transistor, and is operated at high speed. The boundary cell KC1 is adjacent to the two-input NAND cell NC1, and is provided with the switching transistor PWSW1 having the large absolute value of the threshold voltage of the transistor which disconnects the low potential power source Vss according to the control signal SG. In a case where the control signal SG is at a "high" level, the switching transistor is turned "ON." Accordingly, the pseudo low potential power source GVss is connected to the low potential power source Vss, so that the NAND gate 10 is operated at high speed. On the other hand, in a case where the control signal SG is at a "low" level, the switching transistor PWSW1 is turned "OFF." Accordingly, the pseudo low potential power source GVss is disconnected from the low potential power source Vss, so that the leakage current of the NAND gate 10 is cut off. The boundary cell KC1 has a lateral dimension of Xa and a vertical dimension of Ya which is same as that of the two-input NAND cell NC1.

For this reason, a time required for designing the layout can be reduced to one twentieth, or less, of that required in the case of the conventional layout designing in which a cell having a leakage current cut-off circuit inserted into a high speed circuit formed of a transistor having a small absolute value of a threshold voltage is made each time during designing a layout. Furthermore, a boundary cell corresponding to the high speed circuit cell is selected from a several kinds of boundary cells, and a switching transistor is properly disposed (pattern layout) in this boundary cell. Accordingly, correction and modification can be performed more easily than the case of the conventional layout designing, so that the flexibility of layout designing is improved.

It should be noted that, in the present embodiment, the NAND gate for high speed operation is applied to the basic cell, but the NAND gate may be applied to a high speed gate circuit cell such as an inverter, an AND gate, an OR gate or a NOR gate; a high speed sequential circuit cell such as a flip flop, a register, a counter or the like. The NAND gate may also be applied to a high speed CMOS SRAM cell configured of six transistors each having a small absolute value of a threshold voltage. In addition, the NAND gate may be also applied to a high speed comparator cell, a high speed amplifier circuit cell, or a high speed amplifier cell having a differential amplifier stage. Furthermore, in the present embodiment, the switching transistor is disposed on and connected to the side of the low potential power source Vss wiring and the pseudo low potential power source GVss wiring in the boundary cell, but the switching transistor and a pseudo high potential power source GVdd wiring may be disposed on and connected to the side of the high potential power source Vdd wiring in the boundary cell. In this case, it is preferable that a Pch MOS transistor having a large absolute value of a threshold voltage is used as the switching transistor.

Second Embodiment

Figure 6:
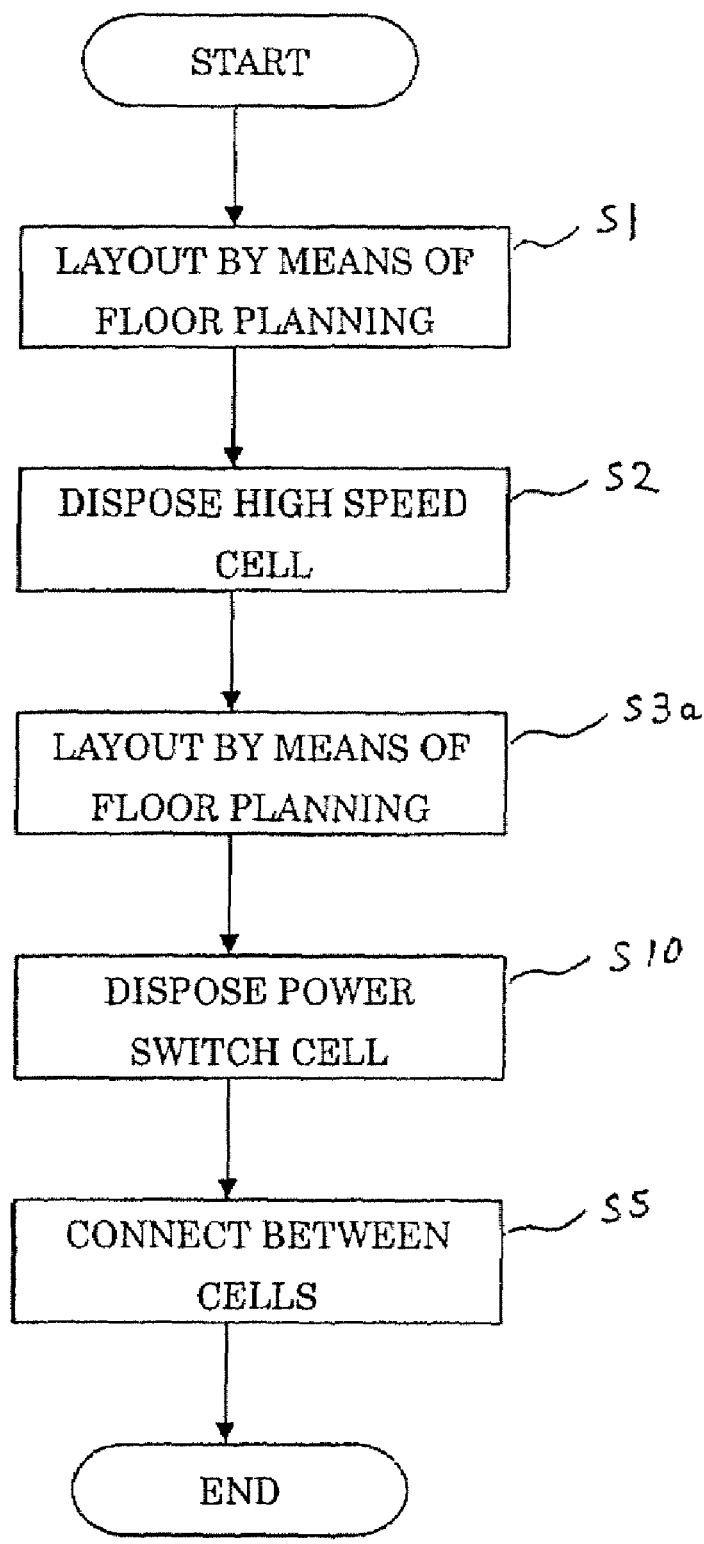
FIG. 6 is an operational flowchart showing a method of designing a layout of a semiconductor integrated circuit according to a second embodiment of the present invention.
Figure 7:
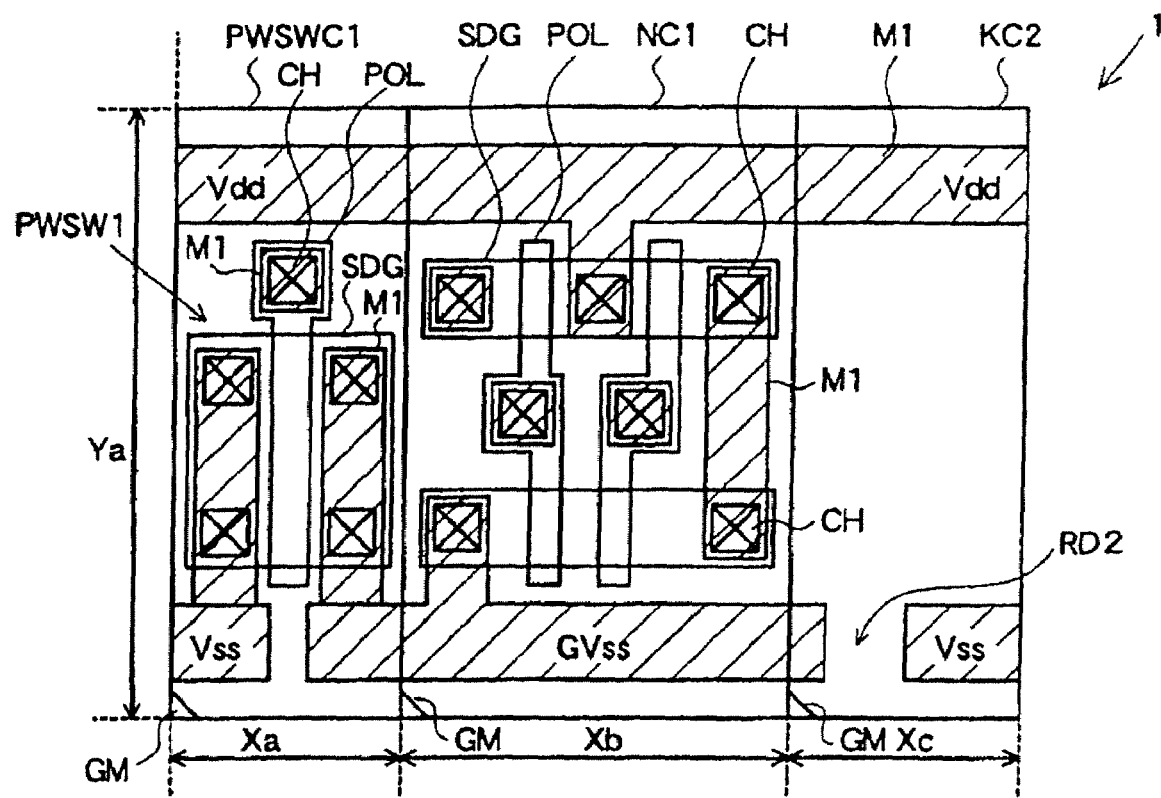
FIG. 7 is a plan view showing a configuration of the semiconductor integrated circuit according to the second embodiment of the present invention, after a switching transistor is inserted thereinto.

Next, a semiconductor integrated circuit according to a second embodiment will be described by referring to the drawings. FIG. 6 is an operational flowchart showing a method of designing a layout of the semiconductor integrated circuit. FIG. 7 is a plan view showing a configuration of the semiconductor integrated circuit after a switching transistor cell is inserted thereinto. In the present embodiment, in place of the boundary cell used in the first embodiment, a switching transistor cell is used, and thereby a power source is isolated.

The same reference numerals will be used for the same components as those of the first embodiment. Accordingly, the description thereof will be omitted. The description will be given only to components different from those of the first embodiment.

As shown in FIG. 6, in the operational flowchart of the method of designing the layout, a layout by means of floor planning (step S1) and disposing a high speed cell (step S2) are firstly performed. These steps are the same as those of the first embodiment. Accordingly, the description thereof will be omitted.

Next, as shown in FIG. 7, a boundary cell KC2 is disposed on the right side of a two-input NAND cell NC1. The disposition and configuration of the boundary cell KC2 are the same as those of the first embodiment (step S3a).

Subsequently, a switching transistor cell PWSWC1 is disposed on the left side of the two-input NAND cell NC1. As shown in FIG. 7, the switching transistor cell PWSWC1 has a cell origin GM disposed in the lower left thereof, and has a lateral dimension of Xa and a vertical dimension of Ya, which are the same as those of the boundary cell KC1.

A switching transistor PWSW1 provided in the switching transistor cell PWSWC1 has the same shape and the same threshold voltage as those of the first embodiment. Each of a high potential power source Vdd wiring, a low potential power source Vss wiring, and a pseudo low potential power source GVss wiring has the same shape as that of the boundary cell KC1.

Here, a cell size in the vertical direction of the switching transistor cell PWSWC1 is set equal to that of the two-input NAND cell NC1 as a basic cell. Accordingly, a time required for designing the layout can be reduced to one tenth, or less, of that required in the case of the conventional layout method that fifty to sixty kinds of MT-COMS cells in which a switching transistor and a logic circuit are made in a same cell are properly disposed each time (step S10).

After that, connection between the cells is performed. The connection between the cells is made in the same layout design as that of the first embodiment shown in FIG. 5. Accordingly, the description thereof will be omitted (step S5).

As described above, in the semiconductor integrated circuit of the present embodiment, the two-input NAND cell NC1 and the switching transistor cell PWSWC1 are provided. The two-input NAND cell NC1 has the small absolute value of the threshold voltage of the transistor, and is operated at high speed. The switching transistor cell PWSWC1 is adjacent to the two-input NAND cell NC1, and is provided with the switching transistor PWSW1 having the large absolute value of the threshold voltage of the transistor disconnecting the low potential power source Vss according to the control signal SG. In a case where the control signal SG is at a "high" level, the switching transistor PWSW1 is turned "ON." Accordingly, the pseudo low potential power source GVss is connected to the low potential power source Vss, so that the NAND gate 10 is operated at high speed. On the other hand, in a case where the control signal SG is at a "low" level, the switching transistor PWSW1 is turned "OFF." Accordingly, the pseudo low potential power source GVss is disconnected from the low potential power source Vss, so that the leakage current from the NAND gate 10 is cut off. The switching transistor cell PWSWC1 has a lateral dimension of Xa and a vertical dimension of Ya which is the same as that of the two-input NAND cell NC1.

Accordingly, a time required for designing the layout can be reduced to one tenth, or less, of that required in the case of the conventional layout designing in which a cell having a leakage current cut-off circuit inserted into a high speed circuit formed of a transistor having a small absolute value of a threshold voltage is made each time during designing a layout.

Third Embodiment

Figure 8:
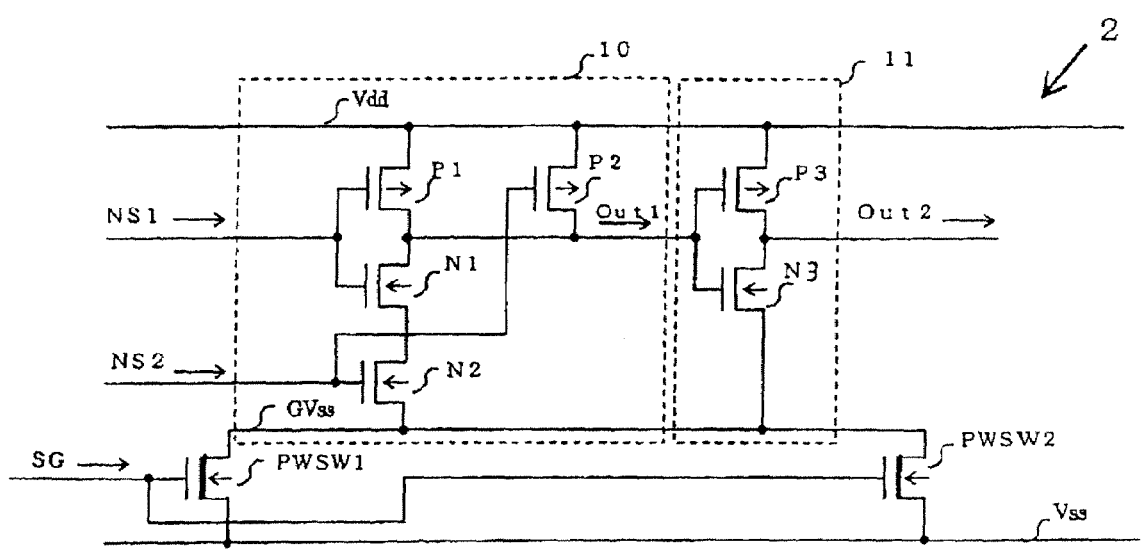
FIG. 8 is a circuit diagram showing a semiconductor integrated circuit according to a third embodiment of the present invention.

Next, a semiconductor integrated circuit according to a third embodiment of the present invention will be described by referring to the drawings. FIG. 8 is a circuit diagram showing the semiconductor integrated circuit. In the present embodiment, switching transistors are disposed respectively on both sides of a plurality of logic circuits.

The same reference numerals will be used for the same components as those of the first embodiment. Accordingly, the description thereof will be omitted. The description will be given only to components different from those of the first embodiment.

As shown in FIG. 8, the semiconductor integrated circuit 2 is provided with a high speed NAND gate 10, a high speed inverter 11, a switching transistor PWSW1 and a switching transistor PWSW2. It should be noted that a logic circuit for low power consumption formed of a high threshold voltage transistor using the MT-CMOS technique, an input/output circuit formed of an intermediate threshold voltage transistor and the like are provided to the semiconductor integrated circuit 2, though not shown in FIG. 8.

The inverter 11 is formed of a Pch MOS transistor P3 and an Nch MOS transistor N3, each of which is a low threshold voltage transistor having an absolute value of a threshold voltage of, for example, |Vth|=0.15 V. The inverter 11 receives an output signal Out1 outputted from the NAND gate 10, and then outputs a logically inversed high speed output signal Out2.

A source of the Pch MOS transistor P3 is connected to a high potential power source Vdd, and the output signal Out1 is inputted to a gate of the Pch MOS transistor P3. A drain of the Nch MOS transistor N3 is connected to a drain of the Pch MOS transistor P3, and a source of the Nch MOS transistor N3 is connected to a pseudo low potential power source GVss. In addition, the output signal Out1 is inputted to a gate of the Nch MOS transistor N3. The high speed output signal Out2 is outputted from a connection node between the drain of the Pch MOS transistor P3 and the drain of the Nch MOS transistor N3.

The switching transistor PWSW2 is formed of an Nch MOS transistor which is a high threshold voltage transistor having an absolute value of a threshold voltage larger than the absolute value of the threshold voltage of the transistor of the NAND gate 10, for example, Vth=0.5 V, similar to the switching transistor PWSW1. A drain of the switching transistor PWSW2 is connected to the pseudo low potential power source GVss, and a source of the switching transistor PWSW2 is connected to a low potential power source Vss, so that a control signal SG is inputted to a gate of the switching transistor PWSW2.

In a case where the control signal SG is at the "high" level, the switching transistors PWSW1 and PWSW2 are turned "ON." Accordingly, the pseudo low potential power source GVss is connected to the low potential power source Vss, so that the NAND gate 10 and the inverter 11 are operated at high speed.

On the other hand, in a case where the control signal SG is at the "low" level, the switching transistors PWSW1 and PWSW2 are turned "OFF." Accordingly, the pseudo low potential power source GVss is disconnected from the low potential power source Vss. Moreover, since the threshold voltage is high, a leakage current is extremely small at the time when the switching transistors PWSW1 and PWSW2 are "OFF." For this reason, the NAND gate 10 and the inverter 11 are not operated. Furthermore, it is possible to cut off the leakage currents respectively of the NAND gate 10 and the inverter 11 each formed of a MOS transistor having a leakage current (also referred to as Idoff being a current at the time of OFF) hundred times, or more, larger than that of a MOS transistor such as the switching transistor PWSW1 having a high threshold voltage (the leakage current does not flow to the side of the low potential power source Vss).

In addition, the switching transistors PWSW1 and PWSW2 are disposed respectively on both sides of the NAND gate 10 and the inverter 11. Accordingly, in a case where the control signal SG is at the "high" level, it is possible to suppress, more than the first embodiment, the floating of a potential of the low potential power source due to resistance components of the switching transistors having turned ON.

Figure 9:
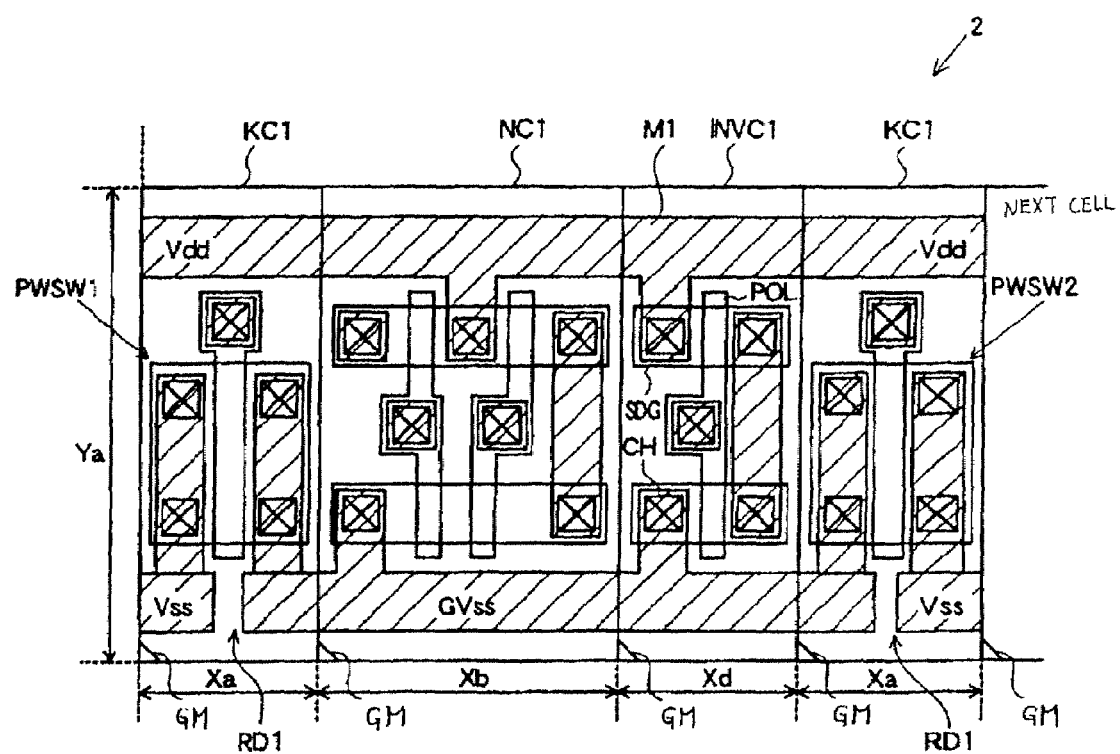
FIG. 9 is a plan view showing a configuration of the semiconductor integrated circuit according to the third embodiment of the present invention, after switching transistors are inserted thereinto.
Figure 10:
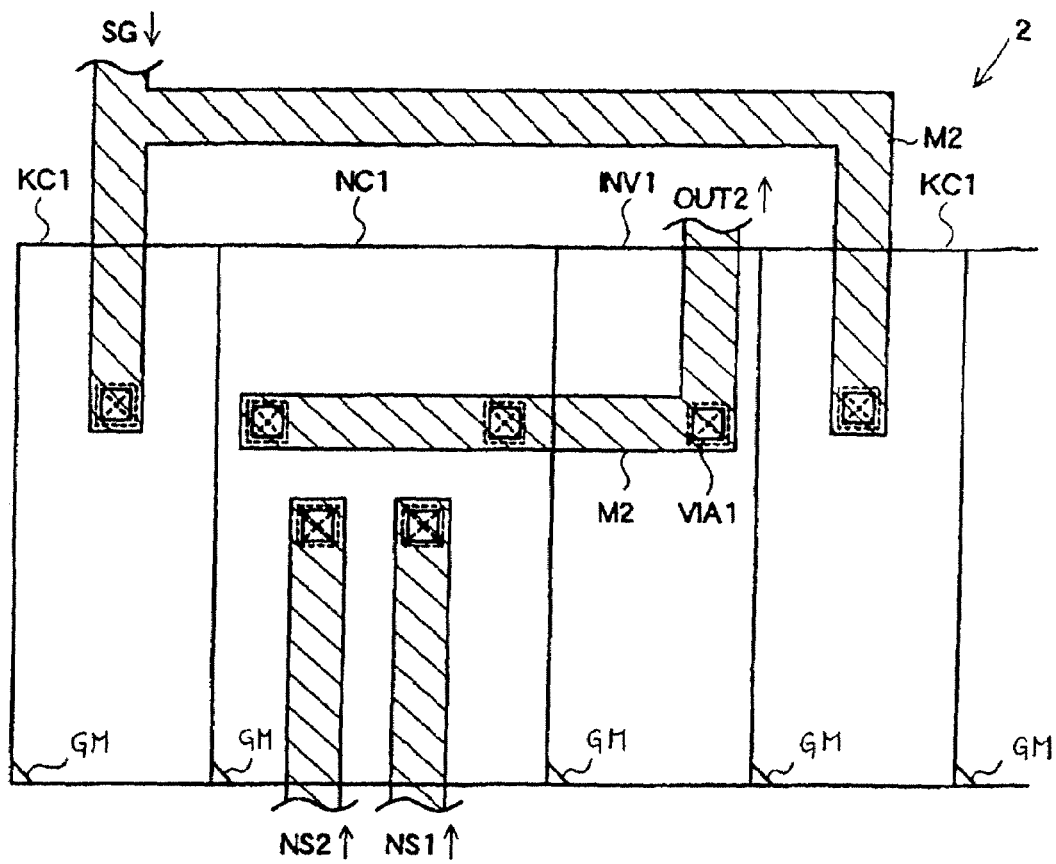
FIG. 10 is a plan view showing a configuration of the semiconductor integrated circuit according to the third embodiment of the present invention, after wirings between cells are connected.

Next, a configuration of a layout of the semiconductor integrated circuit will be described by referring to FIGS. 9 and 10. FIG. 9 is a plan view showing a configuration of the semiconductor integrated circuit after a switching transistor is inserted thereinto. FIG. 10 is a plan view showing a configuration of the semiconductor integrated circuit after a wiring between cells is connected.

As shown in FIG. 9, the semiconductor integrated circuit 2 after the switching transistor is inserted thereinto is formed of: a boundary cell KC1 provided with a switching transistor PWSW1; a two-input NAND cell NC1 provided on the right side of the boundary cell KC1; an inverter cell INVC1 provided on the right side of the two-input NAND cell NC1; and a boundary cell KC1, which is provided on the right side of the inverter cell INVC1, and which is provided with a switching transistor PWSW2. The boundary cell KC1 in which the switching transistor PWSW1 is disposed and the two-input NAND cell NC1 have the same configurations with those of the first embodiment, respectively. Accordingly, the description thereof will be omitted.

The high speed inverter cell INVC1 is formed of a low threshold voltage transistor having an absolute value of a threshold voltage (Vth) of a MOS transistor of 0.15 V. The high speed inverter cell INVC1 has a cell origin GM disposed in the lower left thereof. In addition, the high speed inverter cell INVC1 has a lateral dimension of Xd and a vertical dimension of Ya. As a layer, the high speed inverter cell INVC1 includes a diffusion layer SDG used for forming a transistor region, polysilicon POL for forming a gate electrode and a poly wiring, contact holes CH for contact openings, and a first layer wiring M1. Here, the illustrations of wells provided in the cell and of lower layers formed by ion-implantation and the like are omitted.

The high potential power source Vdd wiring formed of the first layer wiring M1 is disposed in the upper portions of the cells. In addition, the high potential power source Vdd wiring extends to the boundaries of the adjacent cells. On the other hand, the pseudo low potential power source GVss wiring formed of the first layer wiring M1 is disposed in the lower portions of the cells. In addition, the pseudo low potential power source GVss extends to the boundaries of the adjacent cells.

The boundary cell KC1 in which the switching transistor PWSW2 is provided has a cell origin disposed in the lower left thereof, and has a lateral dimension of Xa and a vertical dimension of Ya. In addition, the switching transistor PWSW2 that is a high threshold voltage transistor having the threshold voltage (Vth) of 0.5 V is disposed and formed in the boundary cell KC1 in the same shape as that of the switching transistor PWSW1.

As shown in FIG. 10, in the semiconductor integrated circuit 2 after a wiring between cells is connected, first vias VIA1 are provided in each of lead-out wiring portions of gates of the switching transistors PWSW1 and PWSW2 provided in the boundary cells KC1, and a second layer wiring M2 is disposed on the first via VIA1. This second layer wiring M2 serves as a wiring used for receiving the control signal SG.

First vias VIA1 are provided respectively in two portions in the upper portion of the two-input NAND cell NC1, and a first via VIA1 is also provided in an output portion of the inverter cell INVC1. A second layer wiring M2 is disposed on the first vias VIA1. This second layer wiring M2 serves as a wiring used for outputting the output signal Out2 of the inverter 11.

First vias VIA1 are provided respectively in two portions in the center portion of the two-input NAND cell NC1. Second layer wirings M2 are disposed respectively on the first vias VIA1. These second layer wirings M2 serve as wiring used for receiving the input signals NS1 and NS2, respectively.

Here, the cells are connected by using the first vias VIA1 and the second layer wirings M2. However, the cells may be connected by using a higher layer such as a second via and a third layer wiring. In addition, the directions of extracting the signal lines are not limited to those of the layout shown in FIG. 10.

As described above, the semiconductor integrated circuit of the present embodiment is provided with the two-input NAND cell NC1, the inverter cell INVC1 and the boundary cells KC1.

The two-input NAND cell NC1 has the small absolute value of the threshold voltage of the transistor, and is operated at high speed. The inverter cell INVC1 is adjacent to the right side of the two-input NAND cell NC1. In addition, the inverter cell INVC1 has the small absolute value of the threshold voltage of the transistor, and is operated at high speed. One of the boundary cells KC1 is adjacent to the left side of the two-input NAND cell NC1, and is provided with the switching transistor PWSW1 having the large absolute value of the threshold voltage of the transistor disconnecting the low potential power source Vss according to the control signal SG. The other one of the boundary cells KC1 is adjacent to the right side of the inverter cell INVC1, and is provided with the switching transistor PWSW2 having the large absolute value of the threshold voltage of the transistor disconnecting the low potential power source Vss according to the control signal SG. In a case where the control signal SG is at the "high" level, the switching transistors PWSW1 and PWSW2 are turned "ON." Accordingly, the pseudo low potential power source GVss is connected to the low potential power source Vss, so that the NAND gate 10 and the inverter 11 are operated at high speed. On the other hand, in a case where the control signal SG is at the "low" level, the switching transistors PWSW1 and PWSW2 are turned "OFF." Accordingly, the pseudo low potential power source GVss is disconnected from the low potential power source Vss, so that leakage currents respectively of the NAND gate 10 and the inverter 11 are cut off. Each of the boundary cells KC1 has a lateral dimension of Xa and a vertical dimension of Ya which is the same as that of the two-input NAND cell NC1 and the inverter cell INVC1.

Accordingly, a time required for designing the layout can be reduced to one twentieth, or less, of that required in the case of the conventional layout designing in which a cell having a leakage current cut-off circuit inserted into a high speed circuit formed of a transistor having a small absolute value of a threshold voltage is made each time during designing a layout. In addition, the switching transistors are disposed and formed respectively on both sides of the basic cell. For this reason, it is possible to suppress, more than the first embodiment, the floating of a potential of the low potential power source due to resistance components of the switching transistors having turned ON. In addition, it is possible to improve operational margins of the NAND gate 10 and the high speed inverter 11, respectively. Furthermore, boundary cells corresponding to the high speed circuit cells are selected from a several kinds of boundary cells, and the switching transistors are properly disposed (pattern layout) in the boundary cells. Accordingly, correction and modification can be performed more easily than the case of the conventional layout designing, so that the flexibility of layout designing is improved.

It should be noted that, in the present embodiment, the switching transistors are disposed and formed respectively in the boundary cells, but a switching transistor cell having the same size may be used.

Fourth Embodiment

Figure 11:
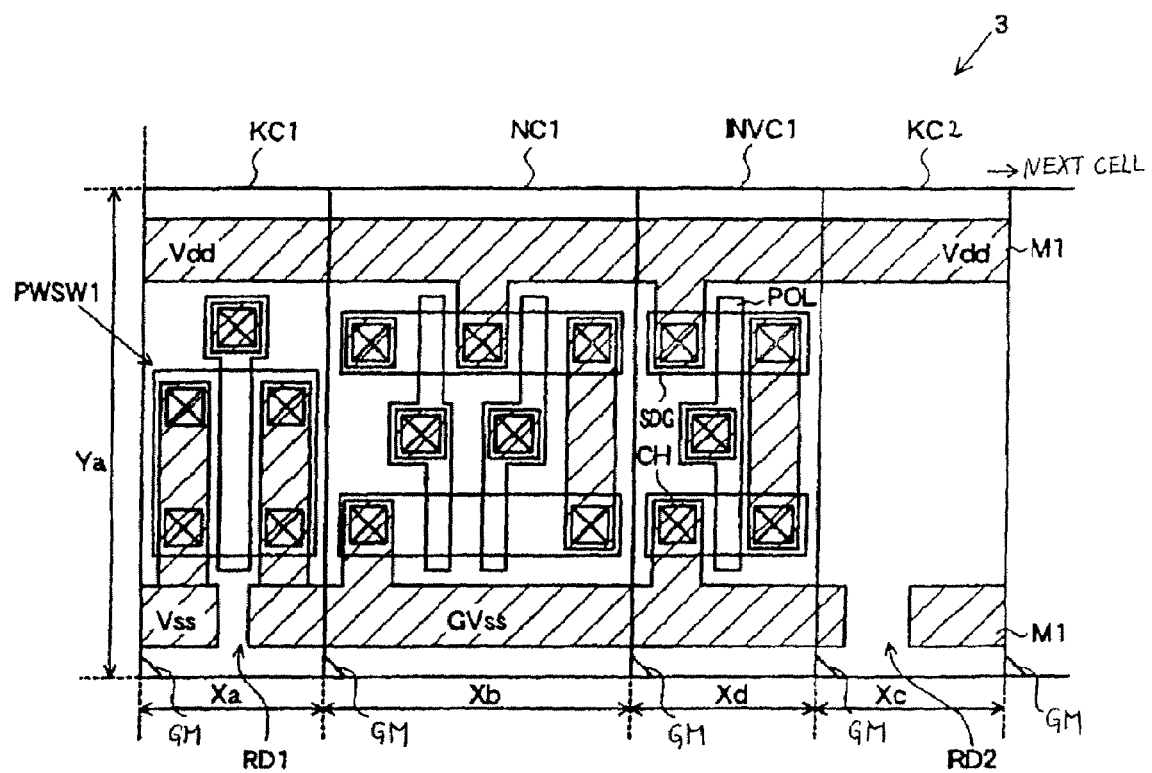
FIG. 11 is a plan view showing a configuration of a semiconductor integrated circuit according to a fourth embodiment of the present invention, after a switching transistor is inserted thereinto.
Figure 12:
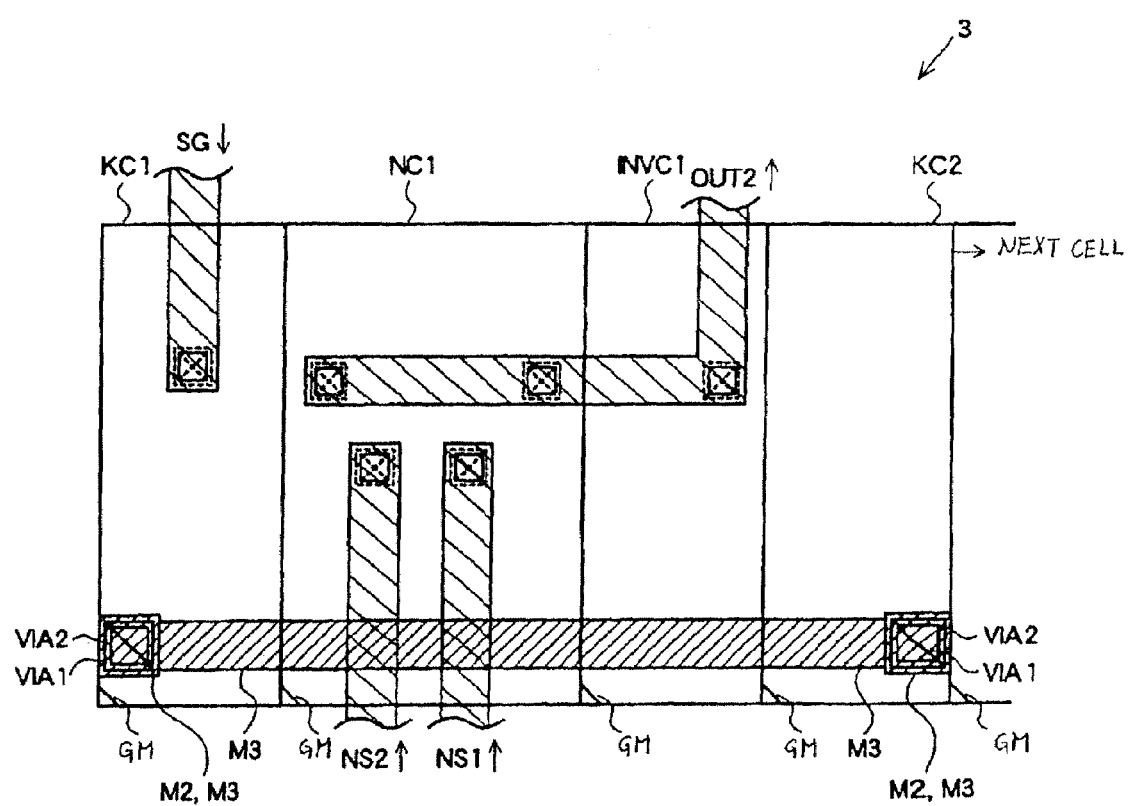
FIG. 12 is a plan view showing a configuration of the semiconductor integrated circuit according to the fourth embodiment of the present invention, after wirings between cells are connected.

Next, a semiconductor integrated circuit according to a fourth embodiment of the present invention will be described by referring to the drawings. FIG. 11 is a plan view showing a configuration of a semiconductor integrated circuit after a switching transistor is inserted thereinto. FIG. 12 is a plan view showing a configuration of the semiconductor integrated circuit after a wiring between cells is connected. In the present embodiment, a low potential power source between two boundary cells is connected by using a higher wiring.

The same reference numerals will be used for the same components as those of the third embodiment. Accordingly, the description thereof will be omitted. The description will be given only to components different from those of the third embodiment.

As shown in FIG. 11, the semiconductor integrated circuit 3 after a switching transistor is inserted thereinto is formed of a boundary cell KC1, a two-input NAND cell NC1, an inverter cell INVC1 and a boundary cell KC2. The boundary cell KC1 is provided with a switching transistor PWSW1. The two-input NAND cell NC1 is provided on the right side of the boundary cell KC1. The inverter cell INVC1 is provided on the right side of the two-input NAND cell NC1. The boundary cell KC2 is provided on the right side of the inverter cell INVC1. In the semiconductor integrated circuit 3, the boundary cell KC1 of the first embodiment, in which the switching transistor PWSW2 is disposed, is replaced by the boundary cell KC2.

As shown in FIG. 12, in the semiconductor integrated circuit 3 after a wiring between cells is connected, a first via VIA1 is provided in a lead-out wiring portion of a gate of the switching transistor PWSW1 provided in the boundary cell KC1. In addition, a second layer wiring M2 is disposed on the first via VIA1. This second layer wiring M2 serves as a wiring used for receiving the control signal SG.

First vias VIA1 are provided respectively in two portions in the upper portion of the two-input NAND cell NC1. In addition, a first via VIA1 is also provided in the output portion of the inverter cell INVC1. In addition, a second layer wiring M2 is disposed on the first vias VIA1. This second layer wiring M2 serves as a wiring used for outputting the output signal Out2 of the inverter 11.

First vias VIA1 are provided respectively in two portions in the center portion of the two-input NAND cell NC1. Second layer wirings M2 are disposed respectively on the first vias VIA1. These second layer wirings M2 serve as wirings used for receiving the input signals NS1 and NS2, respectively.

A first via VIA1, a second layer wiring M2, a second via VIA2, and a third layer wiring M3 are disposed in each of the low potential power source Vss wiring portion of the switching transistor PWSW1 in the boundary cell KC1 and the low potential power source Vss wiring portion on the right side isolated by a power source isolating region RD2 of the boundary cell KC2. The third layer wiring M3 connects therebetween. With the wiring connection by the third layer wiring M3, the cell adjacent to the right side of the boundary cell KC2 is connected to the low potential power source Vss.

As described above, the semiconductor integrated circuit of the present embodiment is provided with the two-input NAND cell NC1, the inverter cell INVC1, the boundary cell KC1 and the boundary cell KC2. The two-input NAND cell NC1 has the small absolute value of the threshold voltage of the transistor, and is operated at high speed. The inverter cell INVC1 is provided on the right side of the two-input NAND cell NC1. In addition, the inverter cell INVC1 has the small absolute value of the threshold voltage of the transistor, and is operated at high speed. The boundary cell KC1 is provided on the left side of the two-input NAND cell NC1. In addition, the boundary cell KC1 is provided with the switching transistor PWSW1 having the large absolute value of the threshold voltage of the transistor disconnecting the low potential power source Vss according to the control signal SG. The boundary cell KC2 is provided on the right side of the inverter cell INVC1. The low potential power source Vss wiring portion of the switching transistor PWSW1 in the boundary cell KC1 and the low potential power source Vss wiring portion on the right side isolated by the power source isolating region RD2 of the boundary cell KC2 are connected to each other by the third layer wiring M3. The cell provided on the right side of the boundary cell KC2 is connected to the low potential power source Vss. In a case where the control signal SG is at the "high" level, the switching transistor PWSW1 is turned "ON." Accordingly, the pseudo low potential power source GVss is connected to the low potential power source Vss, so that the NAND gate 10 and the inverter 11 are operated at high speed. On the other hand, in a case where the control signal SG is at the "low" level, the switching transistor PWSW1 is turned "OFF." Accordingly, the pseudo low potential power source GVss is disconnected from the low potential power source Vss, so that leakage currents respectively of the NAND gate 10 and the inverter 11 are cut off. The boundary cells KC1 and KC2 have a vertical dimension of Ya which is the same as that of the two-input NAND cell NC1 and the inverter cell INVC1.

For this reason, a time required for designing the layout can be reduced, when compared with the case of the conventional layout designing in which a cell having a leakage current cut-off circuit inserted into a high speed circuit formed of a transistor having a small absolute value of a threshold voltage is made each time during designing a layout. In addition, the cell provided on the right side of the boundary cell KC2 is connected to the low potential power source Vss by the third layer wiring M3, so that the flexibility of layout designing can be improved.

Fifth Embodiment

Figure 13:
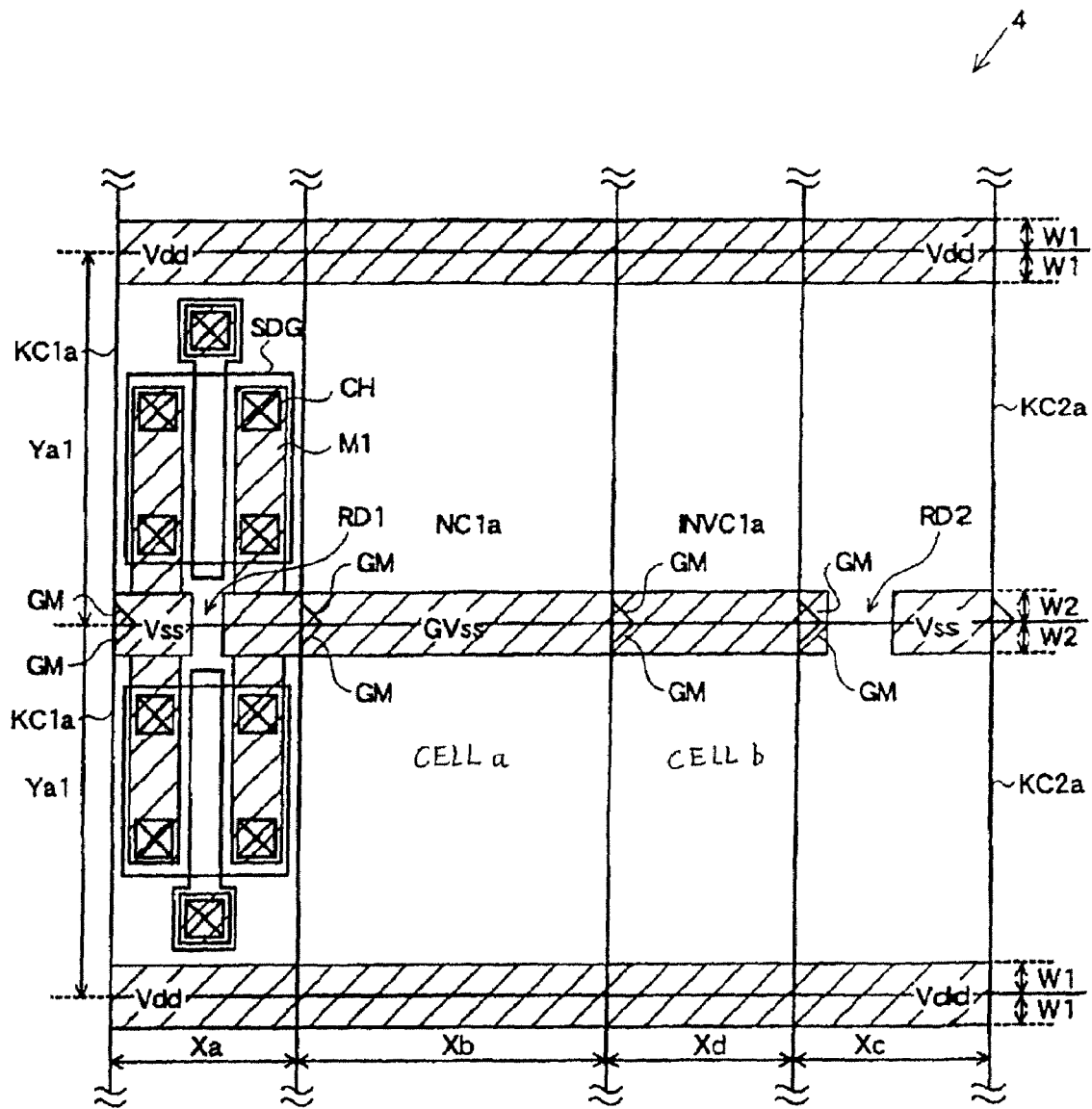
FIG. 13 is a plan view showing a configuration of a semiconductor integrated circuit according to a fifth embodiment of the present invention, after switching transistors are inserted thereinto.

Next, a semiconductor integrated circuit according to a fifth embodiment of the present invention will be described by referring to a drawing. FIG. 13 is a plan view showing a configuration of the semiconductor integrated circuit after a switching transistor is inserted thereinto. In the present embodiment, the cell sizes of a basic cell and a boundary cell are reduced.

The same reference numerals will be used for the same components as those of the first embodiment. Accordingly, the description thereof will be omitted. The description will be given only to components different from those of the first embodiment.

As shown in FIG. 13, the semiconductor integrated circuit 4 after a switching transistor is inserted thereinto is formed of boundary cells KC1a, a two-input NAND cell NC1a provided on the right side of the upper boundary cell KC1a, an inverter cell INVC1a provided on the right side of the two-input NAND cell NC1a, a basic cell CELLa provided on the right side of the lower boundary cell KC1a, a basic cell CELLb provided on the right side of the basic cell CELLa, and two boundary cells KC2a.

These cells have a layer up to a first layer wiring M1, and all of these cells share power source wirings with cells adjacent above and below. That is, the ½ Vdd wiring width W1, which is the width of a high potential power source Vdd wiring, is ½ of the width of the high potential power source Vdd wiring described in the embodiments 1 to 4. In addition, the ½ Vss wiring width W2, which is the width of a low potential power source Vss wiring or a width of the pseudo low potential power source GVss wiring, is ½ of the width of the low potential power source Vss wiring or the width of the pseudo low potential power source GVss wiring, both described in the embodiments 1 to 4.

Each of the boundary cells KC1a has a lateral dimension of Xa and a vertical dimension of Ya1. In addition, each of the boundary cells KC1a is a cell in which a portion above the center portion of the high potential power source Vdd wiring of the boundary cell KC1 and a portion below the center portion of the low potential power source Vss wiring are removed.

The upper and lower boundary cells KC1a share the low potential power source Vss wiring. The upper boundary cell KC1a shares the high potential power source Vdd wiring with the cell on the upper side thereof. The lower boundary cell KC1a shares the high potential power source Vdd wiring with the cell on the lower side thereof. Moreover, the upper boundary cell KC1a has a cell origin GM disposed in the lower left thereof, and the lower boundary cell KC1a has a cell origin GM disposed in the upper left thereof.

Each of the boundary cells KC2a has a lateral dimension of Xc and a vertical dimension of Ya1. In addition, each of the boundary cells KC2a is a cell in which a portion above the center portion of the high potential power source Vdd wiring of the boundary cell KC2 and a portion below the center portion of the low potential power source Vss wiring are removed.

The upper and lower boundary cells KC2a share the low potential power source Vss wiring. The upper boundary cell KC2a shares the high potential power source Vdd with the cell on the upper side thereof. The lower boundary cell KC2a shares the high potential power source Vdd wiring with the cell on the lower side thereof. Moreover, the upper boundary cell KC1a has a cell origin GM disposed in the lower left thereof, and the lower boundary cell KC2a has a cell origin GM disposed in the upper left thereof.

The two-input NAND cell NC1a has a lateral dimension of Xb and a vertical dimension of Ya1. In addition, the two-input NAND cell NC1a is a cell in which a portion above the center portion of the high potential power source Vdd wiring of the two-input NAND cell NC1 and a portion below the center portion of the low potential power source Vss wiring are removed. The two-input NAND cell NC1a shares the high potential power source Vdd wiring with the cell on the upper side thereof. In addition, the two-input NAND cell NC1a has a cell origin GM disposed in the lower left thereof.

The inverter cell INVC1 has a lateral dimension of Xd and a vertical dimension of Ya1. In addition, the inverter cell INVC1 is a cell in which a portion above the center portion of the high potential power source Vdd wiring of the inverter cell INVC1 and a portion below the center portion of the low potential power source Vss wiring are removed. The inverter cell INVC1 shares the high potential power source Vdd wiring with the cell on the upper side thereof. In addition, the inverter cell INVC1 has a cell origin GM disposed in the lower left thereof.

The basic cell CELLa has a MOS transistor that is a low threshold voltage transistor having an absolute value of a threshold voltage of, for example, |Vth|=0.15 V. In addition, the basic cell CELLa has a lateral dimension of Xb and a vertical dimension of Ya1. The basic cell CELLa shares the pseudo low potential power source GVss wiring with the two-input NAND cell NC1a, and also shares the high potential power source Vdd wiring with the cell on the lower side thereof. Moreover, the basic cell CELLa has a cell origin GM disposed in the lower left thereof.

The basic cell CELLa has a MOS transistor that is a low threshold voltage transistor having an absolute value of a threshold voltage of, for example, |Vth|=0.15 V. In addition, the basic cell CELLa has a lateral dimension of Xd and a vertical dimension of Ya1. The basic cell CELLa shares the pseudo low potential power source GVss wiring with the inverter cell INVC1a, and also shares the high potential power source Vdd wiring with the cell on the lower side thereof. Moreover, the basic cell CELLa has a cell origin GM disposed in the lower left thereof.

Each of the switching transistors is formed of an Nch MOS transistor that is a high threshold voltage transistor having an absolute value of a threshold voltage of, for example, Vth=0.5 V. The switching transistors are disposed and formed respectively in the upper and lower boundary cells KC1a so as to be symmetric with each other with respect to the line where the upper and lower boundary cells KC1a come into contact with each other.

In a case where a control signal SG inputted to a gate is at the "high" level, the switching transistors are turned "ON." Accordingly, the pseudo low potential power source GVss is connected to the low potential power source Vss, so that the NAND gate 10, the inverter 11, the circuit provided in the basic cell CELL1a, and the circuit provided in the basic cell CELL1b are operated at high speed.

On the other hand, in a case where the control signal SG is at the "low" level, the switching transistors are turned "OFF." Accordingly, the pseudo low potential power source GVss is disconnected from the low potential power source Vss, so that leakage currents respectively of the NAND gate 10, the inverter 11, the circuits provided respectively in the basic cells CELL1a and CELL1b are cut off.

As described above, in the semiconductor integrated circuit of the present embodiment, the adjacent two boundary cells KC1a are provided respectively with the switching transistors each having the large absolute value of the threshold voltage of the transistor disconnecting the low potential power source Vss according to the control signal SG. In a case where the control signal SG is at the "high" level, the switching transistors are turned "ON." Accordingly, the pseudo low potential power source GVss is connected to the low potential power source Vss, so that the NAND gate 10 including the MOS transistor having the small absolute value of the threshold voltage, the inverter 11, the circuit provided in the basic cell CELL1a, and the circuit provided in the basic cell CELL1b are operated at high speed. On the other hand, in a case where the control signal SG is at the "low" level, the switching transistors are turned "OFF." Accordingly, the pseudo low potential power source GVss is disconnected from the low potential power source Vss, so that leakage currents respectively of the NAND gate 10 including the MOS transistor having the small absolute value of the threshold voltage, the inverter 11, the circuit provided in the basic cell CELL1a, and the circuit provided in the basic cell CELL1b are cut off. In addition, each of the boundary cells KC1a and KC2a has a vertical dimension of Ya1, which is the same as that of the two-input NAND cell NC1a, the inverter cell INVC1a, the basic cell CELL1a and the basic cell CELL1b, and which is also smaller than the vertical dimension Ya of the cells in the embodiments 1 to 4.

For this reason, a time required for designing the layout can be reduced, when compared with the case of the conventional layout designing in which a cell having a leakage current cut-off circuit inserted into a high speed circuit formed of a transistor having a small absolute value of a threshold voltage is made each time during designing a layout. Moreover, the cell size is smaller than that of the first embodiment, so that a chip area can be reduced.

Sixth Embodiment

Figure 14:
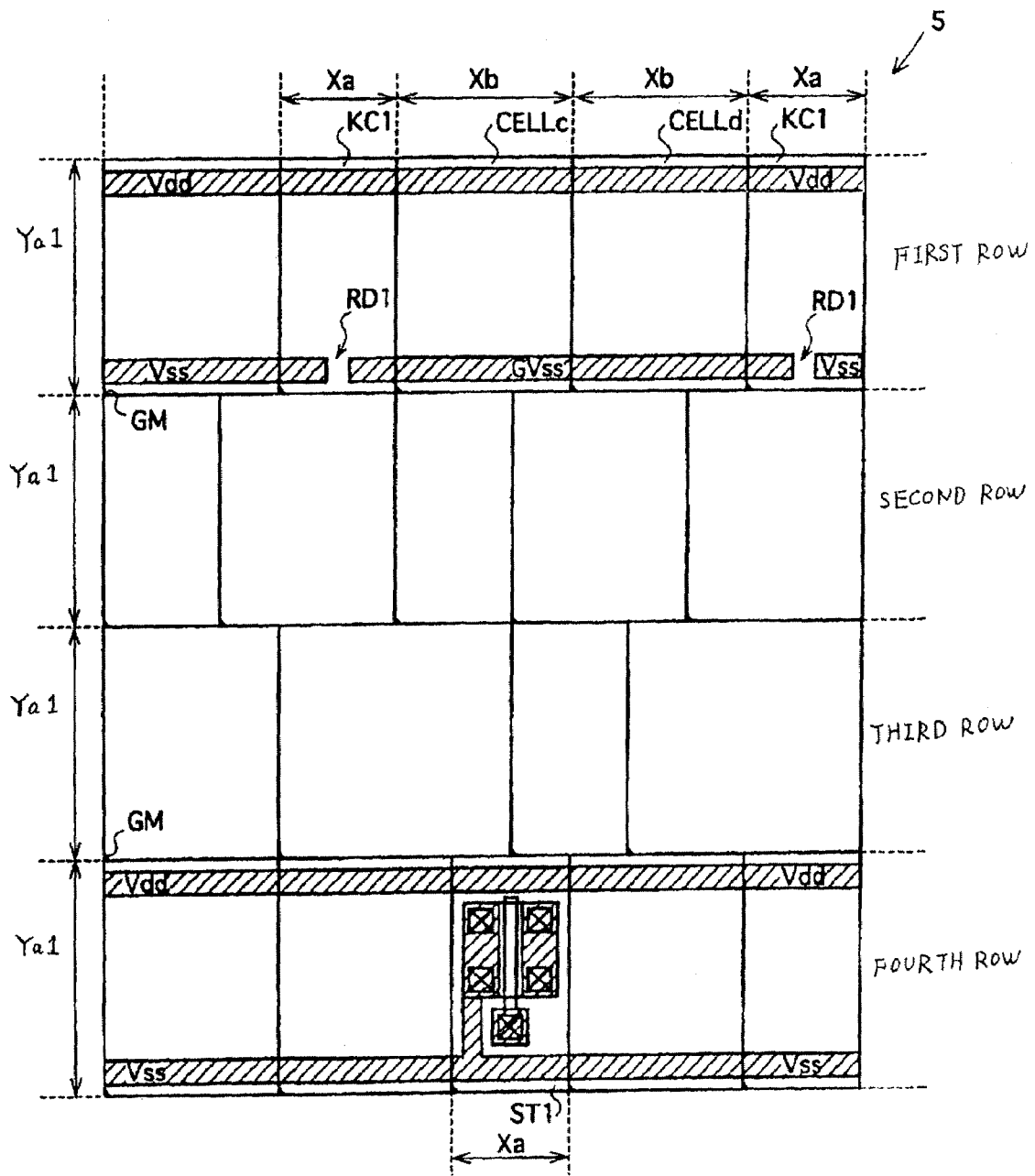
FIG. 14 is a plan view showing a configuration of a semiconductor integrated circuit according to a sixth embodiment of the present invention.
Figure 15:
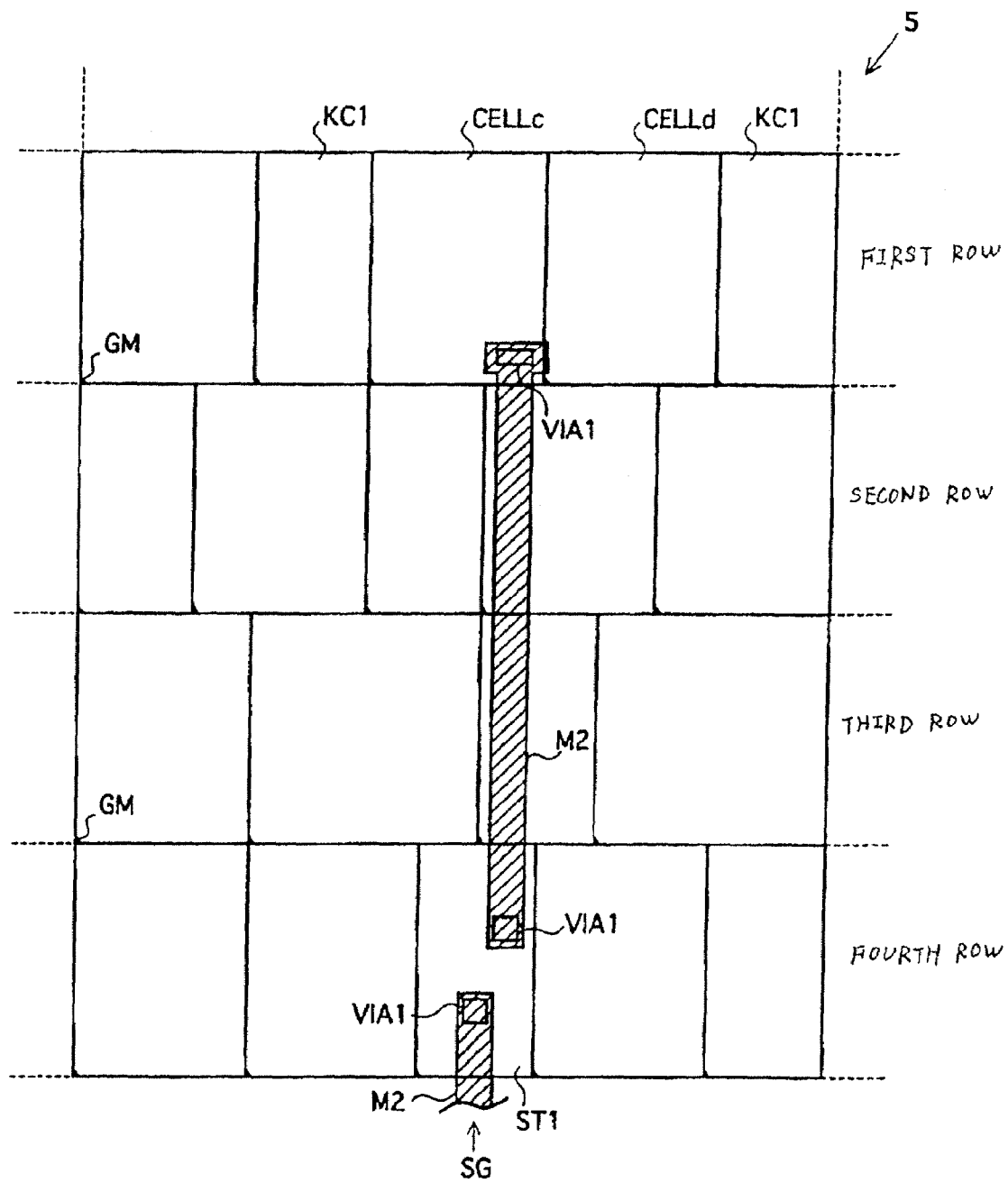
FIG. 15 is a plan view showing a configuration of the semiconductor integrated circuit according to the sixth embodiment of the present invention, after wirings between cells are connected.

Next, a semiconductor integrated circuit according to a sixth embodiment of the present invention will be described by referring to the drawings. FIG. 14 is a plan view showing a configuration of the semiconductor integrated circuit. FIG. 15 is a plan view showing a configuration of the semiconductor integrated circuit after a wiring between cells is connected. In the present embodiment, a low potential power source and a pseudo low potential power source are electrically connected by using a switching transistor cell disposed in a different row.

The same reference numerals will be used for the same components as those of the first embodiment. Accordingly, the description thereof will be omitted. The description will be given only to components different from those of the first embodiment.

As shown in FIG. 14, the semiconductor integrated circuit 5 is provided with two boundary cells KC1, a basic cell CELLc, and a basic cell CELLd in the first row, and a switching transistor cell ST1 in the fourth row. The boundary cells KC1 are provided respectively on both sides of the basic cells CELLc and CELLd, which are adjacent to each other. Each of these cells has a cell origin GM disposed in the lower left thereof, and has a layer up to a first layer wiring M1. Moreover, each of these cells shares power source wrings with cells adjacent above and below.

The basic cell CELLc has a lateral dimension of Xb and a vertical dimension of Ya1. In addition, a high potential power source Vdd wiring of the basic cell CELLc is connected to a high potential power source Vdd wiring of the boundary cell KC1 adjacent to the left side of the basic cell CELLc. Moreover, a pseudo low potential power source GVss wiring of the basic cell CELLc is connected to a pseudo low potential power source GVss wiring of the boundary cell KC1 adjacent to the left side of the basic cell CELLc.

The basic cell CELLd has a lateral dimension of Xb and a vertical dimension of Ya1. A high potential power source Vdd wiring of the basic cell CELLd is connected, to a high potential power source Vdd wiring of the basic cell CELLc adjacent to the left side of the basic cell CELLd, and to a high potential power source Vdd wiring of the boundary cell KC1 adjacent to the right side thereof. A pseudo low potential power source GVss wiring of the basic cell CELLd is connected, to a pseudo low potential power source GVss wiring of the basic cell CELLc adjacent to the left side of the basic cell CELLd, and to a pseudo low potential power source GVss wiring of the boundary cell KC1 adjacent to the right side thereof. The basic cells CELLc and CELLd, which are adjacent to each other, are isolated from the low potential power source Vss by the corresponding boundary cells KC1.

The switching transistor cell ST1 has a lateral dimension of Xa and a vertical dimension of Ya1, and is provided with a switching transistor. A high potential power source Vdd wiring of the switching transistor cell ST1 is connected to high potential power source Vdd wirings of the respective cells on the right and left sides of the switching transistor cell ST. In addition, a low potential power source Vss wiring of the switching transistor cell ST1 is connected, to low potential power source Vss wirings of the respective cells on the right and left sides of the switching transistor cell ST1, and to a source electrode wiring of the switching transistor.

As shown in FIG. 15, in the semiconductor integrated circuit 5 after the wiring between the cells is connected, first vias VIA 1 are provided respectively in a gate lead-out wiring portion and a drain electrode wiring portion of the switching transistor cell ST1, and a pseudo low potential power source Vss wiring portion of the basic cell CELLc. In addition, the drain electrode wiring portion of the switching transistor cell ST1 and the pseudo low potential power source GVss wiring portion of the basic cell CELLc is connected to each other by a second layer wiring M2. The second layer wiring M2 is disposed in the gate lead-out wiring portion of the switching transistor cell ST1, and this second layer wiring M2 serves as a wiring used for receiving the control signal SG.

Here, the switching transistor of the switching transistor cell ST1 is formed of an Nch MOS transistor that is a high threshold voltage transistor having, for example, Vth=0.5 V, which is larger than the absolute value of the threshold voltage of the MOS transistor provided in each of the basic cells CELLc and CELLd.

In a case where the control signal SG inputted to the gate of the switching transistor provided in the switching transistor cell ST1 is at the "high" level, the switching transistor is turned "ON." Accordingly, the pseudo low potential power source GVss is connected to the low potential power source Vss, so that the circuits provided respectively in the basic cells CELLc and CELLd are operated at high speed.

On the other hand, in a case where the control signal SG is at the "low" level, the switching transistor is turned "OFF." Accordingly, the pseudo low potential power source GVss is disconnected from the low potential power source Vss, so that leakage currents of the circuits provided respectively in the basic cells CELLc and CELLd are cut off.

As described above, the semiconductor integrated circuit of the present embodiment is provided with, the basic cells CELLc and CELLd in the first row, and the switching transistor cell ST1 in the fourth row. The basic cells CELLc and CELLd are disconnected from the low potential power sources Vss on the left and right sides thereof by the boundary cells KC1, respectively. Each of the basic cells CELLc and CELLd is provided with the transistor having the small absolute value of the threshold voltage, and is operated at high speed. The switching transistor cell ST1 is provided with the switching transistor, which has the large absolute value of the threshold voltage, and which electrically connects the low potential power source Vss in the fourth row and the pseudo low potential power sources GVss of the basic cells CELLc and CELLd according to the control signal SG. In a case where the control signal SG is at the "high" level, the switching transistor is turned "ON." Accordingly, the pseudo low potential power source GVss is connected to the low potential power source Vss, so that the circuits provided respectively in the basic cells CELLc and CELLd are operated at high speed. On the other hand, in a case where the control signal SG is at the "low" level, the switching transistor is turned "OFF." Accordingly, the pseudo low potential power source GVss is disconnected from the low potential power source Vss, so that leakage currents of the circuits provided respectively in the basic cells CELLc and CELLd are cut off.

Accordingly, a time required for designing the layout can be reduced to one twentieth, or less, of that required in the case of the conventional layout designing in which a cell having a leakage current cut-off circuit inserted into a high speed circuit formed of a transistor having a small absolute value of a threshold voltage is made each time during designing a layout. Furthermore, the switching transistor cell ST1 is provided in the row different from the row where the basic cells CELLc and CELLd are provided. Accordingly, correction and modification can be easily performed more easily than the case of the conventional layout designing, so that the flexibility of layout designing can be improved.

The present invention is not limited to the above-described embodiments, and various modifications may be made on the present invention without departing from the scope of the invention.

For example, in the embodiments, each transistor forming a high speed logic circuit is formed of a MOS transistor. However, a transistor forming a logic circuit, a comparator, an amplifier circuit or the like, which is operated at high speed, may be formed of a bipolar transistor or a BiCMOS.

What is claimed is:
1. A semiconductor integrated circuit comprising:
a first boundary cell having a first power source wiring, a second power source wiring and a first pseudo power source wiring;
a first circuit cell having a third power source wiring connected with the first power source wiring, a second pseudo power source wiring connected with the first pseudo power source wiring, and a first circuit formed of a first circuit transistor; and
a first switching transistor having a first electrode connected with the second power source wiring, a second electrode connected with the first pseudo power source wiring, and a gate electrode,
wherein the first switching transistor is operated to be turned "ON" and "OFF" according to a control signal inputted to the gate electrode of the first switching transistor and
an absolute value of a threshold voltage of the first switching transistor is larger than an absolute value of a threshold voltage of the first circuit transistor.

2. The semiconductor integrated circuit according to claim 1, wherein the first switching transistor is located in the first boundary cell.

3. The semiconductor integrated circuit according to claim 1, further comprising:
- a second circuit cell having a fourth power source wiring connected with the third power source wiring, a third pseudo power source wiring connected with the second pseudo power source wiring, and a second circuit formed of a second circuit transistor;
- a second boundary cell having a fifth power source wiring connected with the fourth power source wiring, a fourth pseudo power source wiring connected with the third pseudo power source wiring, and a sixth power source wiring; and
- a second switching transistor having a first electrode connected with the sixth power source wiring, a second electrode connected with the fourth pseudo power source wiring, and a gate electrode,
- wherein the second switching transistor is operated to be turned "ON" and "OFF" according to the control signal inputted to the gate electrode of the second switching transistor,
- an absolute value of a threshold voltage of the second switching transistor is larger than an absolute value of a threshold voltage of the first and second circuit transistors, and
- the first and second circuit cells are located between first and second boundary cells.

4. The semiconductor integrated circuit according to claim 3, wherein the second switching transistor is located in the second boundary cell.

5. The semiconductor integrated circuit according to claim 1, further comprising:
- a second circuit cell having a fourth power source wiring connected with the third power source wiring, a third pseudo power source wiring connected with the second pseudo power source wiring, and a second circuit formed of a second circuit transistor; and
- a second boundary cell having a fifth power source wiring connected with the fourth power source wiring, a fourth pseudo power source wiring connected with the third pseudo power source wiring, and a sixth power source wiring connected with the second power source wiring,
- wherein an absolute value of a threshold voltage of the first switching transistor is larger than an absolute value of a threshold voltage of the second circuit transistor, and
- the first and second circuit cells are located between first and second boundary cells.

6. The semiconductor integrated circuit according to claim 1, wherein
- the first circuit cell is a rectangular shape and has first edge, second edge opposite to the first edge, and third and fourth edges between the first and second edges and opposite to each other,
- the third power source wiring is along with the first edge,
- the second pseudo power source wiring is along with the second edge,
- the first circuit is located between the third power source wiring and the second pseudo power source wiring, and
- the first boundary cell faces the third edge of the first circuit cell.

7. The semiconductor integrated circuit according to claim 6, further comprising a second circuit cell having a fourth power source wiring line, wherein
- the second circuit cell is located along with the first edge of the first circuit cell, and the third power source wiring of the first circuit cell and the fourth power source wiring of the second circuit cell share a single power source wiring.

8. The semiconductor integrated circuit according to claim 1, further comprising:
- a power source isolating region disposed between the second power source wiring and the first pseudo power source wiring.

9. A semiconductor integrated circuit comprising:
- a switching transistor cell having a first power source wiring, a second power source wiring, a first pseudo power source wiring, and switching transistor; and
- a circuit cell having a third power source wiring connected with the first power source wiring, a second pseudo power source wiring connected with the first pseudo power source wiring, and a circuit formed of a circuit transistor,
- wherein the switching transistor having a first electrode connected with the second power source wiring, a second electrode connected with the first pseudo power source wiring, and a gate electrode,
- the switching transistor is operated to be turned "ON" and "OFF" according to a control signal inputted to the gate electrode of the switching transistor and
- an absolute value of a threshold voltage of the switching transistor is larger than an absolute value of a threshold voltage of the circuit transistor.

10. The semiconductor integrated circuit according to claim 9, wherein
- the circuit cell is a rectangular shape and has first edge, second edge opposite to the first edge, and third and fourth edges between the first and second edges opposite to each other,
- the third power source wiring is along with the first edge,
- the second pseudo power source wiring is along with the second edge,
- the circuit is located between the third power source wiring and the second pseudo power source wiring, and
- the switching transistor cell faces the third edge of the circuit cell.

11. The semiconductor integrated circuit according to claim 9, further comprising:
- a power source isolating region disposed between the second power source wiring and the first pseudo power source wiring.

12. A method of designing a layout of a semiconductor integrated circuit, comprising:
- disposing a boundary cell having a first power source wiring, a second power source wiring and a first pseudo power source wiring;
- disposing, a circuit cell which includes a third power source wiring connected with the first power source wiring, a second pseudo power source wiring connected with the first pseudo power source wiring, and a circuit formed of a circuit transistor; and
- generating, by a computer, a switching transistor, which has an absolute value of a threshold voltage larger than an absolute value of a threshold voltage of the circuit transistor, which is operated to be turned "ON" and "OFF" according to a control signal inputted to a gate of the switching transistor, which electrically connects the first pseudo power source wiring to the second power source wiring when the switching transistor is turned "ON," and which electrically disconnects the first pseudo power source wirings from the second power source wiring when the switching transistor is turned "OFF."

13. The method according to claim 12, wherein the switching transistor is located in the boundary cell.

14. The method according to claim 12, wherein the boundary cell has a power source isolating region disposed between the second power source wiring and the first pseudo power source wiring.

15. A method of designing a layout of a semiconductor integrated circuit, comprising:
disposing a switching transistor cell having a first power source wiring, a second power source wiring, a first pseudo power source wiring, and switching transistor; and
disposing, by a computer, a circuit cell having a third power source wiring connected with the first power source wiring, a second pseudo power source wiring connected with the first pseudo power source wiring, and a circuit formed of a circuit transistor,
wherein the switching transistor having a first electrode connected with the second power source wiring, a second electrode connected with the first pseudo power source wiring, and a gate electrode,
the switching transistor is operated to be turned "ON" and "OFF" according to a control signal inputted to the gate electrode of the switching transistor and
an absolute value of a threshold voltage of the switching transistor is larger than an absolute value of a threshold voltage of the circuit transistor.

16. The method according to claim 15, wherein the switching transistor cell has a power source isolating region which is disposed between the second power source wiring and the first pseudo power source wiring.

* * * * *